US005774437A

United States Patent [19]

Yoshida

[11] Patent Number: 5,774,437
[45] Date of Patent: Jun. 30, 1998

[54] ROTATION CONTROL APPARATUS AND ROTATION CONTROL METHOD FOR DISK TYPE INFORMATION RECORD MEDIUM

[75] Inventor: Masayoshi Yoshida, Tokorozawa-shi, Japan

[73] Assignee: Pioneer Electronic Corporation, Tokyo-to, Japan

[21] Appl. No.: 798,056

[22] Filed: Feb. 11, 1997

[30] Foreign Application Priority Data

Feb. 13, 1996 [JP] Japan .................................. 8-025626

[51] Int. Cl.⁶ .................................................... G11B 7/00
[52] U.S. Cl. .................................................... 369/50
[58] Field of Search .................................. 369/48, 47, 58, 369/50, 49; 360/51

[56] References Cited

U.S. PATENT DOCUMENTS

| | | | |
|---|---|---|---|
| 4,752,837 | 6/1988 | Deland, Sr. ............................ | 360/51 |
| 4,947,264 | 8/1990 | Naousawa ............................... | 369/50 |
| 5,363,360 | 11/1994 | Fairchild ................................ | 369/50 |
| 5,420,842 | 5/1995 | Shimiza ................................. | 369/50 |
| 5,563,860 | 10/1996 | Kubo et al. ............................ | 369/50 |

*Primary Examiner*—Nabil Hindi
*Attorney, Agent, or Firm*—Young & Thompson

[57] ABSTRACT

On an information record medium, a plurality of synchronization signals are recorded by a predetermined record interval such that a record interval of two consecutive synchronization signals is transiently changed from the predetermined record interval. A method of controlling a rotation of a motor to rotate the information record medium is provided with the steps of: detecting the synchronization signals one after another from the information record medium; generating a standard signal having a predetermined cycle which is set in advance in correspondence with the predetermined record interval; detecting a changing amount of an interval, at which the synchronization signals are detected by the synchronization signals detecting steps, from the predetermined record interval; and controlling the rotation of the motor to be in a predetermined rotation condition corresponding to the predetermined cycle by canceling the changing amount detected by the changing amount detecting step, on the basis of the standard signal generated by the standard signal generating step and the changing amount detected by the changing amount detecting step.

14 Claims, 15 Drawing Sheets

RECORDING FORMAT

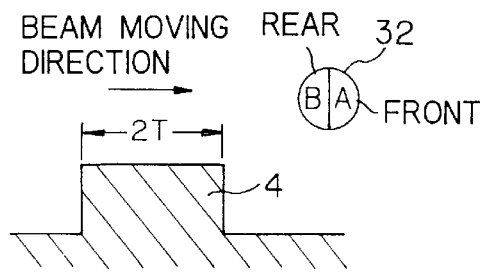
FIG. 6A PRE-PIT SHAPE (SECTION AT LAND TRACK)
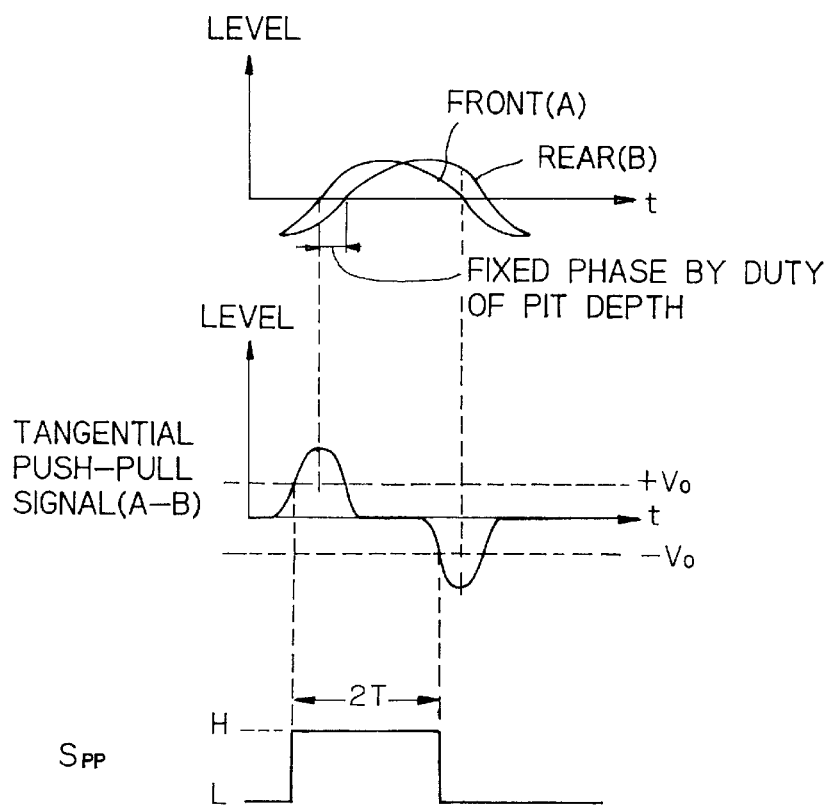
FIG. 6B

ROTATION CONTROL APPARATUS AND ROTATION CONTROL METHOD FOR DISK TYPE INFORMATION RECORD MEDIUM

BACKGROUND OF THE INVENTION

1. Field of the Invention

The present invention is related with a rotation control apparatus for and a rotation control method of controlling a rotation condition of a motor such as a spindle motor to rotate a disk type information record medium such as an optical disk.

2. Description of the Related Art

In an optical disk player for reproducing record information recorded on an optical disk such as a CD (Compact Disk), an LD (Laser Disk), a DVD (Digital Video or Versatile Disk) and so on, the rotation number of a motor such as a spindle motor is controlled by detecting a synchronization signal, which is recorded periodically by a constant interval along an information track on the optical disk together with the record information in accordance with the record information, comparing the cycle (i.e. the period) of the detected synchronization signal with a predetermined constant cycle of a standard signal, which is set in advance (i.e., which is set to be such a cycle as to reproduce the record information in an optimum condition when rotating the optical disk by this cycle), and controlling the difference between those compared cycles to be zero, i.e., controlling the cycle of the detected synchronization signal to be equal to the cycle of the standard signal.

However, the above explained rotation control method is based on a premise that the synchronization signal is recorded periodically by a constant interval (i.e. by a constant cycle or period). Thus, in case of an optical disk on which the synchronization signals on one area of the optical disk are recorded by an interval different from that of the synchronization signals on another area of the optical disk, it is impossible to keep a precise rotation condition (e.g. a CLV (Constant Linear Velocity) condition or a CAV (Constant Angular Velocity) condition) over all areas of the optical disk by the above explained control method.

Namely, if the above explained rotation control method is adapted to the optical disk, on which the synchronization signals on one area are recorded by an interval different from that of the synchronization signals on another area, the rotation control is conducted such that the interval of the synchronization signals on said one area is controlled or adjusted to be equal to the interval of the standard signal (which corresponds to the synchronization signal on said another area). Thus, in said one area, where the synchronization signals which interval are different from that of the synchronization signals in said another area are detected, the rotation number is offset from (i.e. larger or smaller than) the rotation number to be ideally obtained, by a rotation amount corresponding to the difference between these intervals of the synchronization signal. Namely, there is a problem that the rotation control based on the cycle of the standard signal results in generating an undesirable irregularity of the rotation against the purpose of the rotation control.

SUMMARY OF THE INVENTION

Then, the present invention is proposed from the viewpoint of the above mentioned problems. It is therefore an object of the present invention to provide a rotation control apparatus and a rotation control method, which can keep the precise rotation condition even in the case of a disk type information record medium on which the synchronization signals on one area of the record medium are recorded by an interval different from those of the synchronization signals on another area.

The above object of the present invention can be achieved by a method of controlling a rotation of a motor to rotate an information record medium, on which a plurality of synchronization signals are recorded by a predetermined record interval such that a record interval of two consecutive synchronization signals is transiently changed from the predetermined record interval. The method of the present invention is provided with the steps of: detecting the synchronization signals one after another from the information record medium; generating a standard signal having a predetermined cycle which is set in advance in correspondence with the predetermined record interval; detecting a changing amount of an interval, at which the synchronization signals are detected by the synchronization signals detecting step, from the predetermined record interval; and controlling the rotation of the motor to be in a predetermined rotation condition corresponding to the predetermined cycle by canceling the changing amount detected by the changing amount detecting step, on the basis of the standard signal generated by the standard signal generating step and the changing amount detected by the changing amount detecting step.

According to the method of the present invention, at first, the synchronization signals are detected one after another from the information record medium by the synchronization signals detecting step. On the other hand, a standard signal having a predetermined cycle, which is set in advance in correspondence with the predetermined record interval, is generated by the standard signal generating step, while a changing amount of an interval, at which the synchronization signals are detected by the synchronization signals detecting step, from the predetermined record interval is detected by the changing amount detecting step. Then, the rotation of the motor is controlled, by the controlling step, to be in a predetermined rotation condition corresponding to the predetermined cycle by canceling the changing amount detected by the changing amount detecting step, on the basis of the standard signal generated by the standard signal generating step and the changing amount detected by the changing amount detecting step. Thus, even if the rotation of the information record medium, on which a plurality of synchronization signals are recorded such that a record interval of two consecutive synchronization signals is transiently changed from the predetermined record interval, is to be controlled on the basis of the synchronization signals, the predetermined rotation condition can be precisely obtained. Thus, by maintaining the precise rotation condition, it is possible to precisely perform the recording operation.

In one aspect of the method of the present invention, the changing amount detecting step is provided with the step of comparing the predetermined cycle of the standard signal generated by the standard signal generating step with a cycle of the synchronization signals detected by the synchronization signals detecting step.

According to this aspect, since the predetermined cycle of the standard signal is compared with a cycle of the detected synchronization signals, the changing amount can be detected by use of a rather simple process.

In another aspect of the method of the present invention, the changing amount detecting step is provided with the steps of: generating a plurality of gate signals one after another which have time lengths corresponding to the changing amount respectively and which have time differences by amounts corresponding to the changing amount from each other, on the basis of the detected synchronization signals; and judging one of the gate signals corresponding to each of the detected synchronization signals so as to detect the changing amount.

According to this aspect, since the changing amount is detected by judging one of the gate signals corresponding to each of the detected synchronization signal, the changing amount can be detected by use of a rather simple process.

In another aspect of the method of the present invention, the controlling step is provided with the step of controlling the rotation of the motor by changing the cycle of the standard signal in the standard signal generating step on the basis of the detected changing amount.

According to this aspect, since the cycle of the standard signal is changed on the basis of the detected changing amount, even if an error is included in the detected synchronization signal, the precise rotation control can be performed.

In another aspect of the method of the present invention, the controlling step is provided with the step of controlling the rotation of the motor by changing a cycle of the synchronization signals detected by the synchronization signals detecting step on the basis of the detected changing amount.

According to this aspect, since the cycle of the synchronization signal is changed on the basis of the detected changing amount, it is possible to control the rotation of the motor without changing the cycle of the standard signal, and to prevent the generation of the error due to the change in the cycle of the standard signal.

In another aspect of the method of the present invention, the information record medium is a disk type information record medium such as a DVD-R (DVD-Recordable); and the controlling step is provided with the step of controlling the rotation of the motor to be in a CLV (Constant Linear Velocity) condition as the predetermined rotation condition.

According to this aspect, since the rotation of the motor is controlled to be in the CLV condition, it is possible to increase the recording or reproducing time of the information record medium under the condition of the precise rotation control.

In another aspect of the method of the present invention, the information record medium is a disk type information record medium such as a DVD-R; and the controlling step is provided with the step of controlling the rotation of the motor to be in a CAV (Constant Angular Velocity) condition as the predetermined rotation condition.

According to this aspect, since the rotation of the motor is controlled to be in the CAV condition, it is possible to easily perform a random accessing operation of the information record medium under the condition of the precise rotation control.

The above object of the present invention can be also achieved by an apparatus for controlling a rotation of a motor to rotate an information record medium, on which a plurality of synchronization signals are recorded by a predetermined record interval such that a record interval of two consecutive synchronization signals is transiently changed from the predetermined record interval. The apparatus of the present invention is provided with: a synchronization signals detection device for detecting the synchronization signals one after another from the information record medium; a standard signal generation device for generating a standard signal having a predetermined cycle which is set in advance in correspondence with the predetermined record interval; a changing amount detection device for detecting a changing amount of an interval, at which the synchronization signals are detected by the synchronization signals detection device, from the predetermined record interval; and a controller for controlling the rotation of the motor to be in a predetermined rotation condition corresponding to the predetermined cycle by canceling the changing amount detected by the changing amount detection device, on the basis of the standard signal generated by the standard signal generation device and the changing amount detected by the changing amount detection device.

According to the apparatus of the present invention, at first, the synchronization signals are detected one after another from the information record medium by the synchronization signals detection device. On the other hand, the standard signal is generated by the standard signal generation device, while the changing amount of the interval from the predetermined record interval is detected by the changing amount detection device. Then, the rotation of the motor is controlled, by the controller, to be in the predetermined rotation condition by canceling the changing amount on the basis of the standard signal and the changing amount. Thus, in the same manner as the aforementioned method of the present invention, even if the rotation of the information record medium, on which a plurality of synchronization signals are recorded such that a record interval of two consecutive synchronization signals is transiently changed from the predetermined record interval, is to be controlled on the basis of the synchronization signals, the predetermined rotation condition can be precisely obtained.

In one aspect of the apparatus of the present invention, the changing amount detection device is provided with a comparison device for comparing the predetermined cycle of the standard signal generated by the standard signal generation device with a cycle of the synchronization signals detected by the synchronization signals detection device.

According to this aspect, since the predetermined cycle of the standard signal is compared with the cycle of the detected synchronization signals, by the comparison device, the changing amount can be detected by use of a rather simple construction.

In another aspect of the apparatus of the present invention, the changing amount detection device is provided with: a gate signal generation device for generating a plurality of gate signals one after another which have time lengths corresponding to the changing amount respectively and which have time differences by amounts corresponding to the changing amount from each other, on the basis of the detected synchronization signals; and a judgment device for judging one of the gate signals corresponding to each of the detected synchronization signals so as to detect the changing amount.

According to this aspect, since the changing amount is detected, by the changing amount detection device, by judging one of the gate signals corresponding to each of the detected synchronization signals, the changing amount can be detected by use of a rather simple process.

In another aspect of the apparatus of the present invention, the controller controls the rotation of the motor by changing the cycle of the standard signal in the standard signal generation device on the basis of the detected changing amount.

According to this aspect, since the cycle of the standard signal is changed by the controller on the basis of the detected changing amount, even if an error is included in the detected synchronization signal, the precise rotation control can be performed.

In another aspect of the apparatus of the present invention, the controller controls the rotation of the motor by changing a cycle of the synchronization signals detected by the synchronization signals detection device on the basis of the detected changing amount.

According to this aspect, since the cycle of the synchronization signal is changed by the controller on the basis of the detected changing amount, it is possible to control the rotation of the motor without changing the cycle of the standard signal, and to prevent the generation of the error due to the change in the cycle of the standard signal.

In another aspect of the apparatus of the present invention, the information record medium is a disk type information record medium such as a DVD-R; and the controller controls the rotation of the motor to be in a CLV condition as the predetermined rotation condition.

According to this aspect, since the rotation of the motor is controlled to be in the CLV condition by the controller, it is possible to increase the recording or reproducing time of the information record medium under the condition of the precise rotation control.

In another aspect of the apparatus of the present invention, the information record medium is a disk type information record medium such as a DVD-R; and the controller controls the rotation of the motor to be in a CAV condition as the predetermined rotation condition.

According to this aspect, since the rotation of the motor is controlled to be in the CAV condition by the controller, it is possible to easily perform a random accessing operation of the information record medium under the condition of the precise rotation control.

The nature, utility, and further features of this invention will be more clearly apparent from the following detailed description with respect to a preferred embodiment of the invention when read in conjunction with the accompanying drawings briefly described below.

BRIEF DESCRIPTION OF THE DRAWINGS

FIG. 6A is a cross-sectional view of a pre-pit of the DVD-R for generating a tangential push-pull signal at a light detector;

FIG. 6B is a diagram for explaining the generation of the tangential push-pull signal due to the pre-pit of FIG. 6A;

DETAILED DESCRIPTION OF THE PREFERRED EMBODIMENTS

Preferred embodiments of the present invention are explained with reference to the drawings.

In the embodiments explained hereinbelow, the present invention is adapted to a DVD-R (DVD-Recordable) of a WO (Write Once) type among optical disks of various high recording density types represented by the DVD, whose recording densities are dramatically improved over conventional CDs and the like, and which can store one full movie etc. on a single disk.

(I) Construction of DVD-R

First of all, before explaining concrete embodiments of the present invention, the DVD-R, to which the present invention is adapted, is explained with reference to FIGS. 1 and 2.

On the optical disk of WO type in general, pre-information to perform a positional search at a time of writing the record information is recorded in advance at a time of producing the optical disk at the stage of pre-formatting the optical disk. Here, address information etc. showing a writing position on the optical disk of the record information is included in the pre information.

The optical disk of WO type is generally provided, on an information record surface thereof, with a groove track to record the record information and a land track to guide an irradiation position of a light beam, which is to optically write or record the record information, to the groove track. On the DVD-R, the pre-information is recorded by forming a pre-pit on the land track by a cutting machine etc..

Nextly, a concrete structure of the DVD-R is explained with reference to FIG.1.

Figure 1:
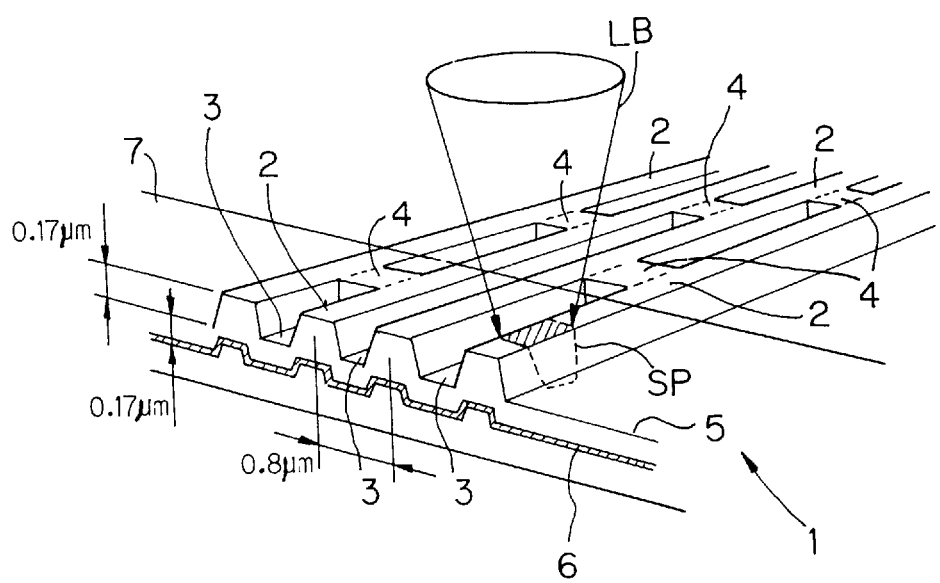
FIG. 1 is a schematic appearance view showing an example of the DVD R in which a pre-pit is formed on a land track.

In FIG.1, a DVD-R 1 is a pigment type DVD-R, which has a pigment film 5 and to which information can be written only one time. A groove track 2 as an information record track and a land track 3 as a guide track for guiding a light beam LB, such as a laser beam and the like as a reproduction light or a record light, to the groove track 2 are formed in the DVD-R 1 by a cutting machine and the like. The DVD-R 1 is also provided with a protection layer 7 for protecting them and a gold deposition film 6 for reflecting the light beam LB at a time of reproducing the recorded information. A pre-pit 4 corresponding to the pre-information is formed on this land track 3 by the cutting machine and the like. This pre pit 4 is formed in advance before the DVD-R 1 is shipped. It is noted here that the "land" track and the "groove" track are defined relative to each other as shown in FIG. 1, and the track of either one type may be defined as the land track while the track of the other type is defined as the groove track.

When recording the record information (i.e. the substantial record information, such as the video information, the audio information and the like, to be inherently recorded other than the pre-information) onto the DVD-R 1, the pre information is obtained, in advance of actually recording the record information, by detecting this pre-pit 4 by an information recording apparatus. On the basis of the pre-information, a rotation number of the DVD-R 1 is set (in case of the DVD-R 1, it is set to be the rotation number for the CLV rotation), and the address information and the like indicative of a position of the DVD-R 1, at which each record information is to be recorded, are obtained. The record information is recorded on the corresponding record position on the basis of this address information.

When recording the record information, the light beam LB is irradiated such that a center thereof coincides with a center of the groove track 2. Then, a record information pit corresponding to the record information is formed on the groove track 2, and accordingly the record information is recorded. At this time, a size of a light spot SP is set such that it is irradiated to not only the groove track 2 but also the land track 3, as shown in FIG. 1. The pre-information is obtained, in advance of actually recording the record information, by detecting the pre-pit 4 by means of a tangential push-pull method described later, by using a portion of reflection light of the light spot SP partially irradiated to the land track 3.

Next, a recording format of the pre-information on the DVD R 1 is explained with reference to FIG. 2.

Figure 2:
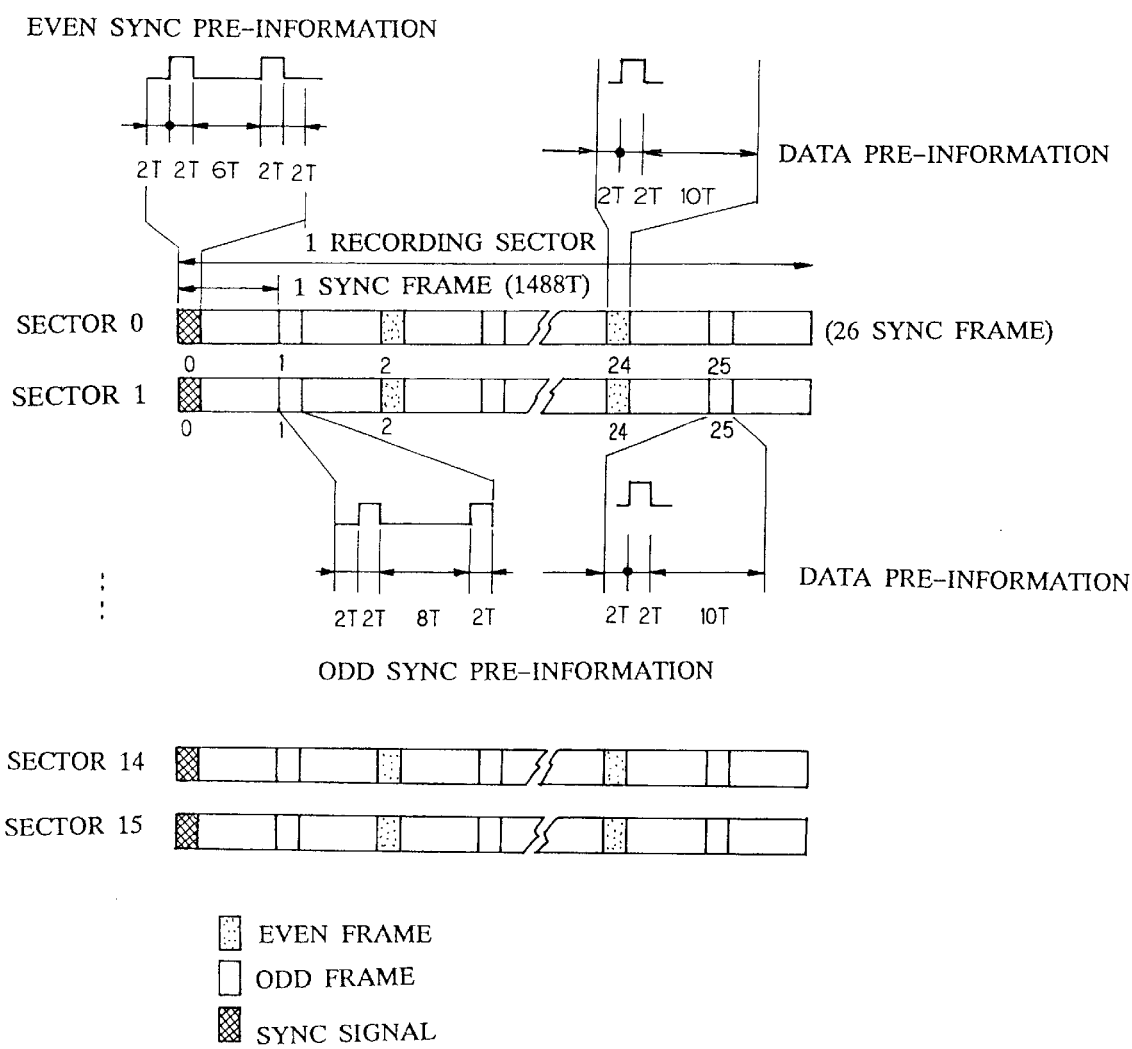
FIG. 2 is a diagram showing a recording format of the pre-information and the record information.

As shown in FIG. 2, the pre-information for the DVD-R 1 is recorded for each synchronization frame (SYNC frame) as an information unit. Further, one recording sector as an information unit row is formed by 26 synchronization frames. Further, one ECC (Error Correcting Code) block is formed by 16 recording sectors. One synchronization frame has a length equal to 1488 times (1488T) of the unit length (hereafter, referred to as "T") corresponding to a pit interval defined by the recording format at a time of recording the record information. In FIG. 2, a plurality of recording sectors are recorded continuously on one land track 3.

The pre-information is recorded at a top portion with a length of 14T in each of the synchronization frames. In the present embodiment, the pre-information is recorded only on the synchronization frames having even numbers (hereafter, referred to as EVEN frames) or the synchronization frames having odd numbers (hereafter, referred to as ODD frames), in one recording sector. The recorded pre information is classified into synchronization pre-signal, which corresponds to a synchronization signal of the pre-information, and data pre information. Among them, the synchronization pre signal is recorded at a position of the synchronization frame, in which the top pre-information in each of the recording sectors is to be recorded (i. e. the 0th frame for the EVEN SYNC, and the 1st frame for the ODD SYNC). The synchronization pre-signal recorded in the EVEN frame (EVEN SYNC pre-signal) and the synchronization pre-signal recorded in the ODD frame (ODD SYNC pre-signal) are recorded by different patterns, as show in FIG. 2. It is possible to read out these patterns at a time of recording the record information, to thereby judge whether the pre-information is recorded in the EVEN frame or the ODD frame.

The reason why the pre-information is recorded in such an arrangement that it is dissipated only in the EVEN frame or only in the ODD frame as described above is as follows. Namely, at a time of producing the DVD R 1, assuming that plurality of pre pits 4 are formed such that they are concentrated in one area, at a time of coating the material to form the pigment film 5 by means of a spinner coating method etc., this material tends to flow into the pre-pits 4, which have been formed in advance, in this one area. This results in that the pigment film having a designed predetermined thickness cannot be formed on the groove track 2 (in addition, if th pigment film 5 having the predetermined thickness is not formed such a problem happens that the direct current component of the reproduced signal is changed at a time of reproducing the record information).

On the other hand, the data pre-information is dissipated into a plurality of synchronization frames and recorded thereon. In one synchronization frame, the data pre-information corresponding to [1] is recorded by a length of 2T (i.e., the unit of the pre-information is 2T), as shown in FIG. 2.

In FIG. 2, for example, in the recording sector 0, the pre-information is recorded on the EVEN frame (EVEN SYNC pre-information). In the recording sector 1, the pre-information is recorded on the ODD frame (ODD SYNC pre-information).

Further, the record information, which is recorded on the basis of the detected pre information by the information recording apparatus, has the format similar to the recording format shown in FIG. 2. At this time, in the record information, the synchronization signal is recorded at the top of every synchronization frame, and the substantial record data, such as the videoinformation the audio information and the like, are recorded on positions other than the top portion with 14T, in one synchronization frame. In the pre-information, no information is recorded on the positions other than the top portion with 14T, in one synchronization frame.

Here, in the DVD-R 1, since the pre-information is recorded only in the EVEN frames or only in the ODD frames as described above, and since the synchronization pre-signal is recorded at the position of the top EVEN frame among the EVEN frames or at the top ODD frame among the ODD frames in each recording sector, in case of detecting the pre-information at the time of recording the record information, when the record position of the pre-information is change from the EVEN frame to the ODD frame or changed from the ODD frame to the EVEN frame, the cycle of the detected synchronization pre-signal is changed as compared with the case where the EVEN frames or the ODD frames are continuous.

Figure 3:
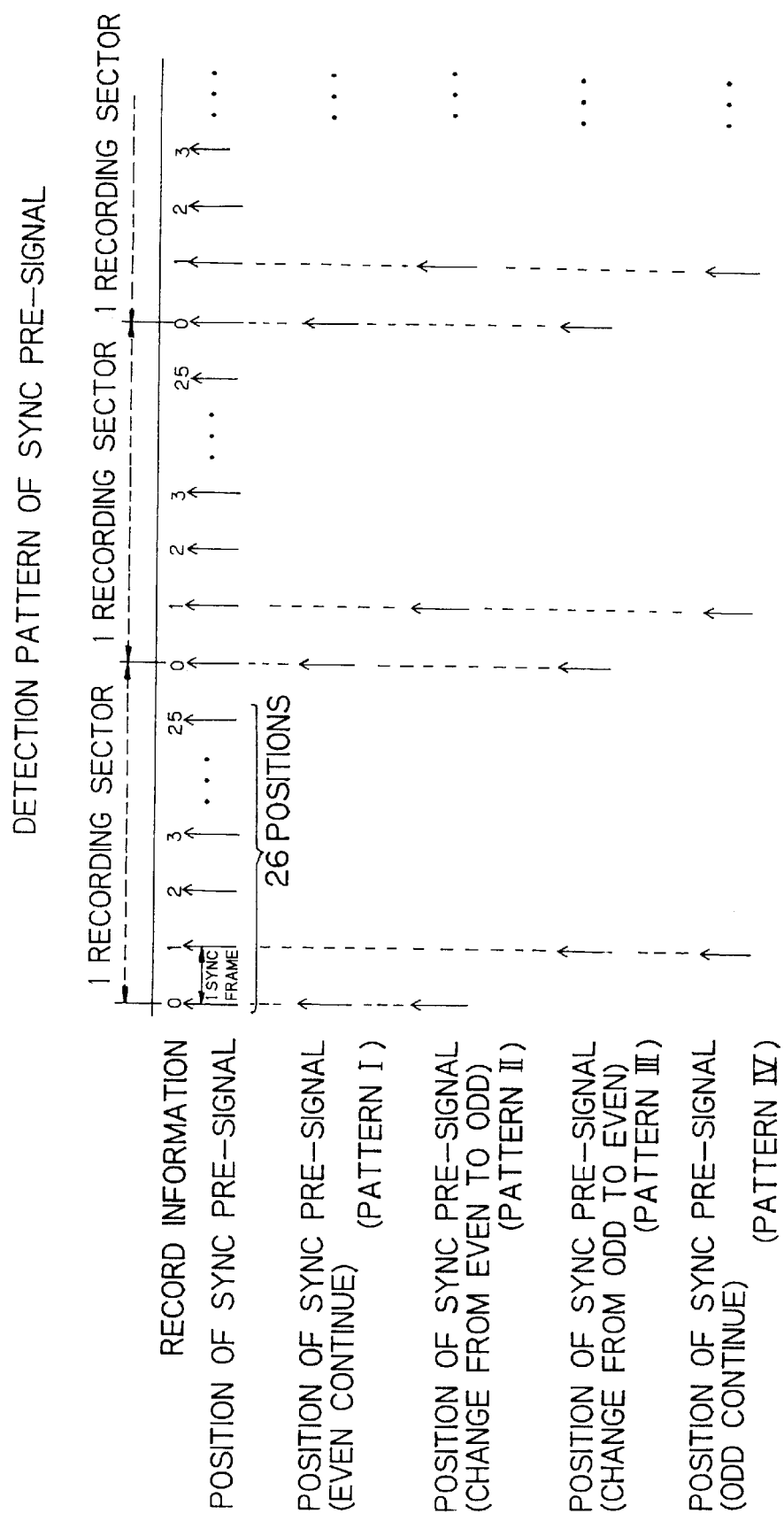
FIG. 3 is a diagram showing detection patterns of a sync pre-information.

Namely, as shown in FIG. 3, in case that the EVEN frames are continuous in the signal detection (hereinbelow, it is referred to as a "detection pattern I ") or in case that the ODD frames are continuous in the signal detection (hereinbelow, it is referred to as a "detection pattern IV", the synchronization pre-information is detected precisely by an interval of one recording sector. On the other hand, in case that the record position of the synchronization pre-information is changed from the EVEN frame to the ODD frame in the signal detection (it is referred to as a "detection pattern II"), the interval of the synchronization pre-signal upon changing is increased to be longer by a length of one synchronization frame than the interval of one recording sector. Further, in case that the record position of the synchronization pre-information is changed from the ODD frame to the EVEN frame in the signal detection (it is referred to as a "detection pattern III"), the interval of the synchronization pre-signal upon changing is decreased to be shorter by a length of one synchronization frame than the interval of one recording sector. Even in case of the detection pattern II or III, after the interval changes once respectively, the cycle of the synchronization pre-signal is recovered to the length of one recording sector.

In this manner, even with respect to the DVD-R 1, on which the synchronization pre-signals in one area of the disk are different in interval from those on another area of the disk, a precise CLV rotation can be maintained.

(II) First Embodiment

Next, a rotation control apparatus as a first embodiment of the present invention will be explained with reference to FIGS. 4 to 12.

Figure 4:
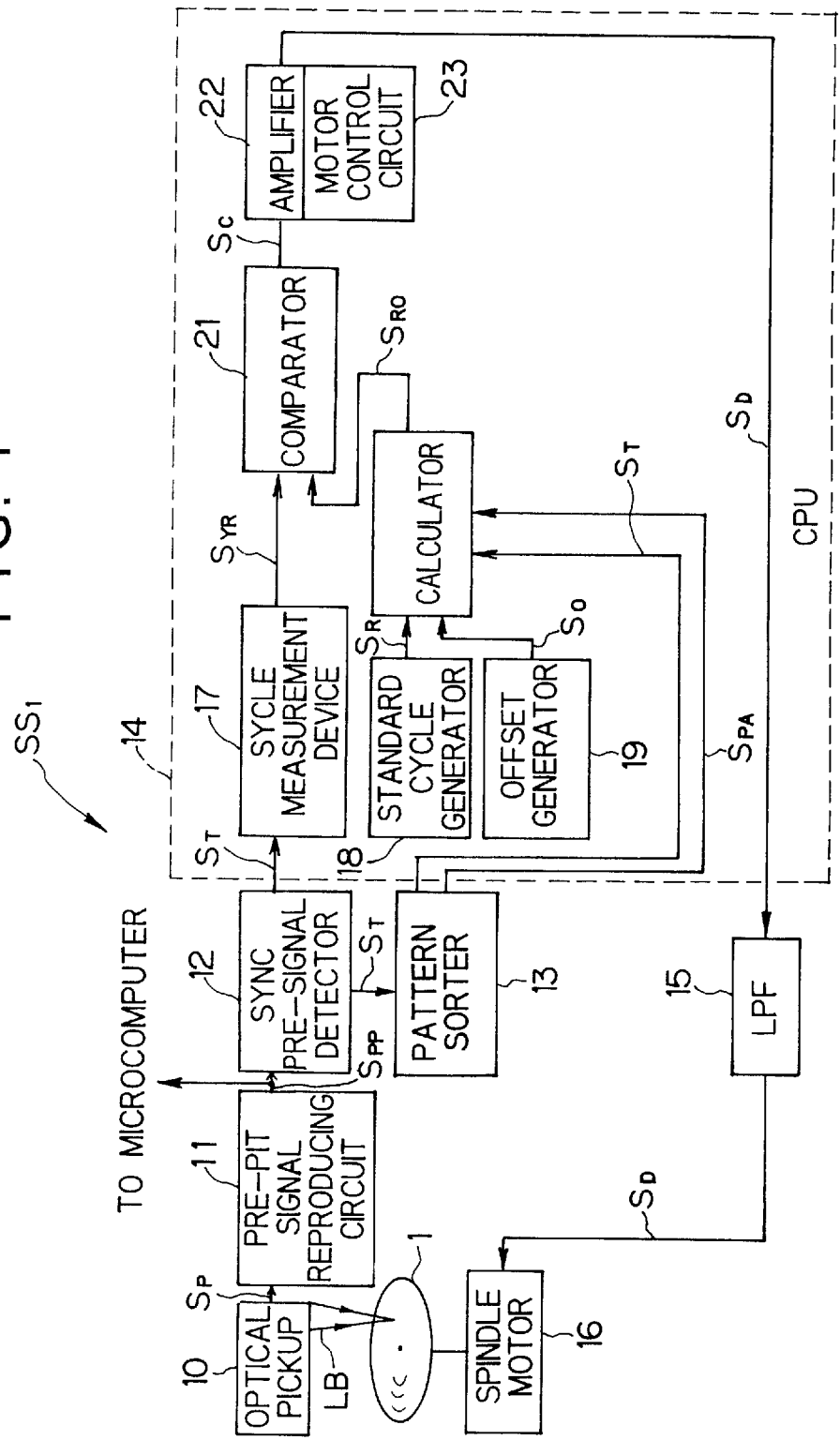
FIG. 4 is a block diagram of a rotation control apparatus as a first embodiment of the present invention.

At first, a whole configuration of the rotation control apparatus of the first embodiment is explained with reference to FIG. 4. In FIG. 4, among the constitutional elements of an information recording apparatus for recording the record information onto the DVD-R 1, only the constitutional elements related to the rotation control apparatus as the first embodiment are illustrated, and the illustrations and the detailed explanations of the other constitutional elements of the information recording apparatus such as an encoding unit, a focusing servo unit and a trackin servo unit with respect to the light beam LB etc. are omitted sinc those have the same constructions as the conventional information recording apparatus.

As shown in FIG. 4, a rotation control apparatus $SS_1$ as the first embodiment is provided with: an optical pickup 10, as one example of a synchronization signal detection means, which contains a laser diode, an objective lens, a polarization beam splitter, a light detector and the like that described later in detail are not illustrated, for irradiating a light beam LB as a record light onto a DVD-R 1 to which the pre-information is recorded by forming the pre-pit 4, receiving a reflection light from the pre-pit 4, and outputting a detection signal $S_p$ to detect the pre-information by means of a tangential push-pull method; a pre-pit signal reproducing circuit 11 for generating a reproduction signal $S_{PP}$ as the pre-information corresponding to the pre-pit 4 from the detection signal $S_p$; a synchronization pre-signal detector 12 for extracting and detecting the sync pre-signal from the reproduction signal $S_{PP}$, and outputting a timing signal $S_T$ corresponding to a timing of the signal detection of the sync pre signal; a pattern sorter 13, as one example of a changing amount detection means, for judging to which detection pattern among the aforementioned detection patterns (i.e. the detection pattern I to the detection pattern IV shown in FIG. 3) the cycle of the detected sync pre-signal corresponds on the basis of the timing signal $S_T$, outputting a judgment signal $S_{PA}$, and outputting the timing signal $S_T$ as it is; a CPU (Central Processing Unit) 14, as one example of a controller, for outputting a driving signal $S_D$ to rotate a spindle motor 16 described later on the basis o the timing signal $S_T$ and the judgment signal $S_{PA}$; a LPF (Low Pass Filter) 15 for removing a high frequency noise component included in the driving signal $S_D$ outputted from the CPU 14; and a spindle motor 16 as a motor for rotating the DVD-R 1 on the basis of the driving signal $S_D$. In the above described construction, the judgment signals $S_{PA1}$ and $S_{PA2}$ described later in detail are included in the judgment signal $S_{PA}$.

The CPU 14 is provided with: a cycle measurement device 17 for measuring the cycle of the sync pre-signal on the basis of the timing signal $S_T$ and outputting a cycle signal $S_{YR}$; a standard cycle generator 18 for generating and outputting a standard signal $S_R$ having a standard cycle $T_{ref}$ corresponding to a length of one recording sector (refer to FIG. 2); an offset generator 19 as a changing amount detection means for generating and outputting an offset signal So having a cycle To corresponding to one sync frame (refer to FIG. 2); a calculator 20 for adding or subtracting the offset signal So with respect to the standard signal $S_R$ on the basis of the judgment signal $S_{PA}$ and outputting a calculation signal $S_{RO}$ having a calculated cycle T; a comparator 21 for comparing the cycle of the cycle signal $S_{YR}$ and the calculated cycle T of the calculation sign al $S_{RO}$ and outputting a comparison signal Sc indicating the difference between the compared cycles; a motor control circuit 23 for gene rating the driving signal $S_D$ to control the rotation number of the spindle motor 16 to rotate the spindle motor 16 so that the difference between the cycle of the cycle signal $S_{YR}$ and the calculated cycle T be zero; and an amplifier 22 for amplifying the driving signal $S_D$.

Nextly, the operation of the whole apparatus is explained.

In FIG. 4, the pre-information, which is detected and reproduced from the DVD-R 1 by the optical pickup 10 and the pre-pit signal reproducing circuit 11, is inputted to the sync pre-signal detector 12 as the reproduction signal $S_{PP}$, the sync pre-signal is detected, and the timing signal $S_T$ corresponding to the sync pre-signal is outputted. At this time, the reproduction signal $S_{PP}$ is also outputted to a microcomputer which is not illustrated in the figure, and the address information etc. for indicating a record position on the optical disk is obtained form the data pre-information by the microcomputer.

On the other hand. the timing signal $S_T$ outputted from the sync pre-signal detector 12 is outputted to the CPU 14, and to the pattern sorter 13, where it is judged to which detection pattern among the aforementioned detection patterns the cycle of the sync pre-signal (detected by the sync pre-signal detector 12) corresponds, and a judgment signal $S_{PA}$ is outputted. Then, by the CPU 14, the driving signal $S_D$ to keep the rotation condition of the DVD-R 1 to the CLV rotation condition even under a condition where the cycle of the sync pre-signal is temporarily or transiently changed, is generated on the basis of these outputted timing signal $S_T$ and the judgment signal $S_{PA}$. Then, the spindle motor 16 is controlled on the basis of the driving signal $S_D$.

Figure 5:
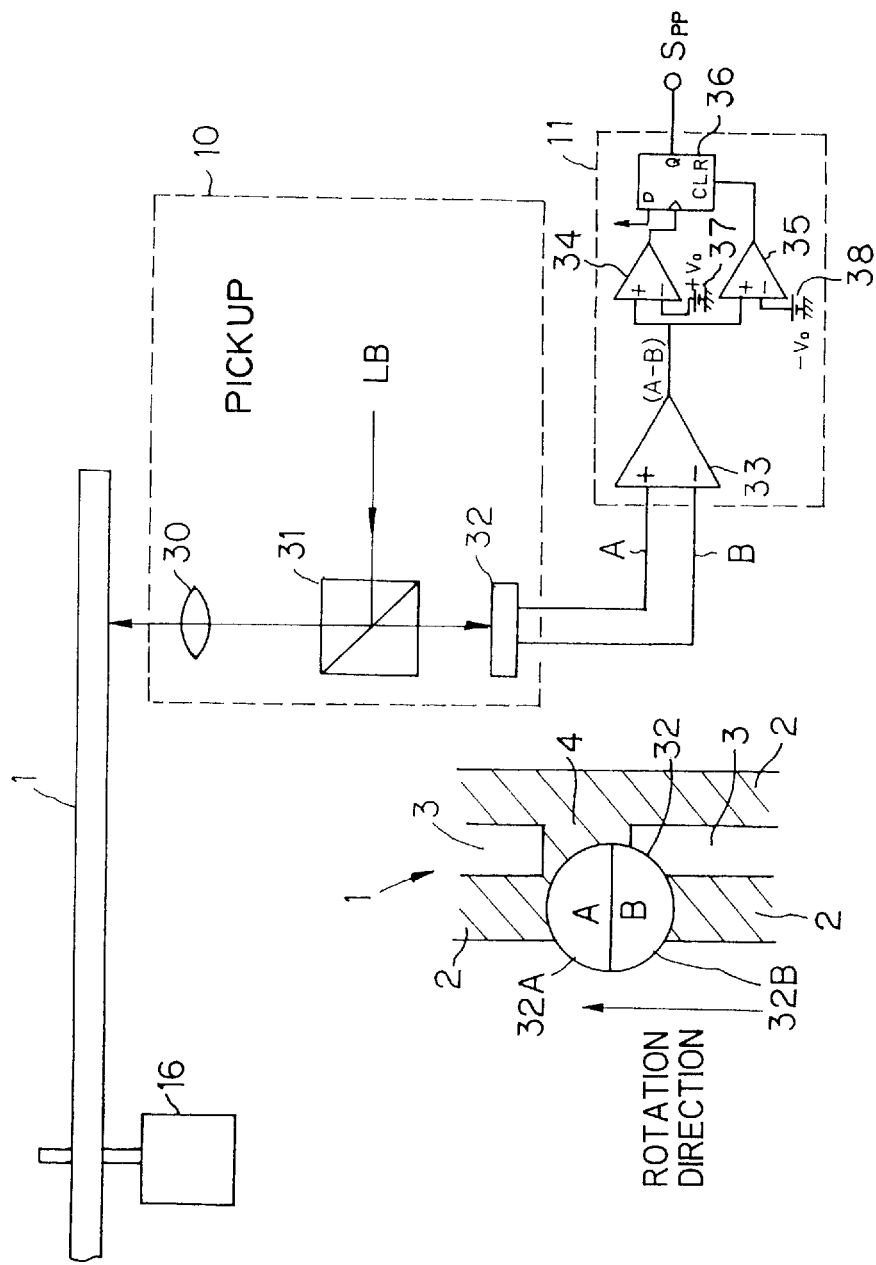
FIG. 5 is a block diagram showing schematic configurations of an optical pickup and a pre-pit signal reproducing circuit of the embodiment.

Next, the above mentioned tangential push pull method used to detect the pre-information is explained, with detailed configurations of the pickup 10 and the pre-pit signal reproducing circuit 11, with reference to FIGS. 5 to 6B.

The tangential push pull method refers to a push-pull method in a rotation direction of the DVD-R 1. This is a method of reproducing the above mentioned pre-information, on the basis of a differential signal of two partial detectors in the light detector, in which a reflection light from the light spot SP by the light beam LB formed on the land track 3 of the DVD-R 1 is detected by the two partial detectors divided by a division line optically vertical to a moving direction (i.e. the rotation direction of the disk) of the pre-pit 4.

That is, more actually, as shown in FIG. 5, in the optical pickup 10, the light beam LB as the record light (the reproduction light to the pre-pit 4) generated by the laser diode and the like (not shown) is reflected on the polarization beam splitter 31, and collected on the groove track 2 and the land track 3 of the DVD-R 1 (refer to FIG. 1) by the objective lens 30. Then, the reflection light of the light beam LB, which is modulated by the pre-pit 4 and in which a polarization surface is rotated by the reflection on the DVD-R 1, is transmitted through the polarization beam splitter 31 by the rotation of the polarization surface, and is irradiated to respective light-receiving surfaces of the light detector 32, which is divided into two partial detectors 32A and 32B by the division line optically vertical to the rotation direction of the DVD-R 1, and then it is detected. Light receiving-outputs of the respective partial detectors 32A and 32B (in the following explanation, the outputs of the respective partial detectors are indicate by symbols A and B) are subtracted by a subtractor 33 constituting the pre-pit signal reproducing circuit 11. Then, the differential signal (A–B) is compared with a standard voltage +Vo, which is inputted from a standard voltage unit 37, and a standard voltage −Vo, which is inputted from a standard voltage unit 38, by a subtractors 34 and 35 respectively. The outputs of the subtractors 34 and 35 are respectively inputted to a flip flop circuit 36. Then, the output of the flip-flop circuit 36 is outputted to the sync pre-signal detector 12 and the micro computer not illustrated in the figure as the reproduction signal (i.e. the pre pit information) $S_{PP}$.

Next, the generations of the differential signal (tangential push-pull signal) (A−B) and the reproduction signal $S_{PP}$ by means of the light detector 32 and the pre pit signal reproducing circuit 11 is explained with reference to FIGS. 6A and 6B.

In FIG. 6A, when the light detector 32 receives the reflection light from the pre-pit 4 having a shape indicative of a section view in the rotation direction of the DVD-R 1, the light receiving outputs of the partial detectors 32A and 32B are outputted from the respective partial detectors 32A and 32B as RF (Radio Frequency) signals A (front signal) and B (rear signal) whose phases are different from each other, as shown in FIG. 6B, on the basis of positional deviations thereof. Then, the subtractor 33 determines a difference between the respective RF signals. Accordingly, the differential signal (tangential push-pull signal) (A−B) is generated as shown in FIG. 6B. This differential signal is inputted to the subtractors 34 and 35 respectively, is compared with the standard voltages +Vo and −Vo respectively. By use of the respective comparison results, the flip-flop 32 is operated, so that the reproduction signal $S_{PP}$ as shown in FIG. 6B is generated. By this, the pre-information (which includes the sync pre-signal and the data pre-information) which is included in the reproduction signal $S_{PP}$ is outputted to the sync pre-signal detector 12 and the microcomputer not illustrated respectively.

Nextly, the constructions and the operations of the sync pre-signal detector 12 and the pattern sorter 13 are explained with reference to FIGS. 7 to 12.

At first, the constructions of the sync pre-signal detector 12 and the pattern sorter 13 are explained with reference to FIG. 7.

Figure 7:
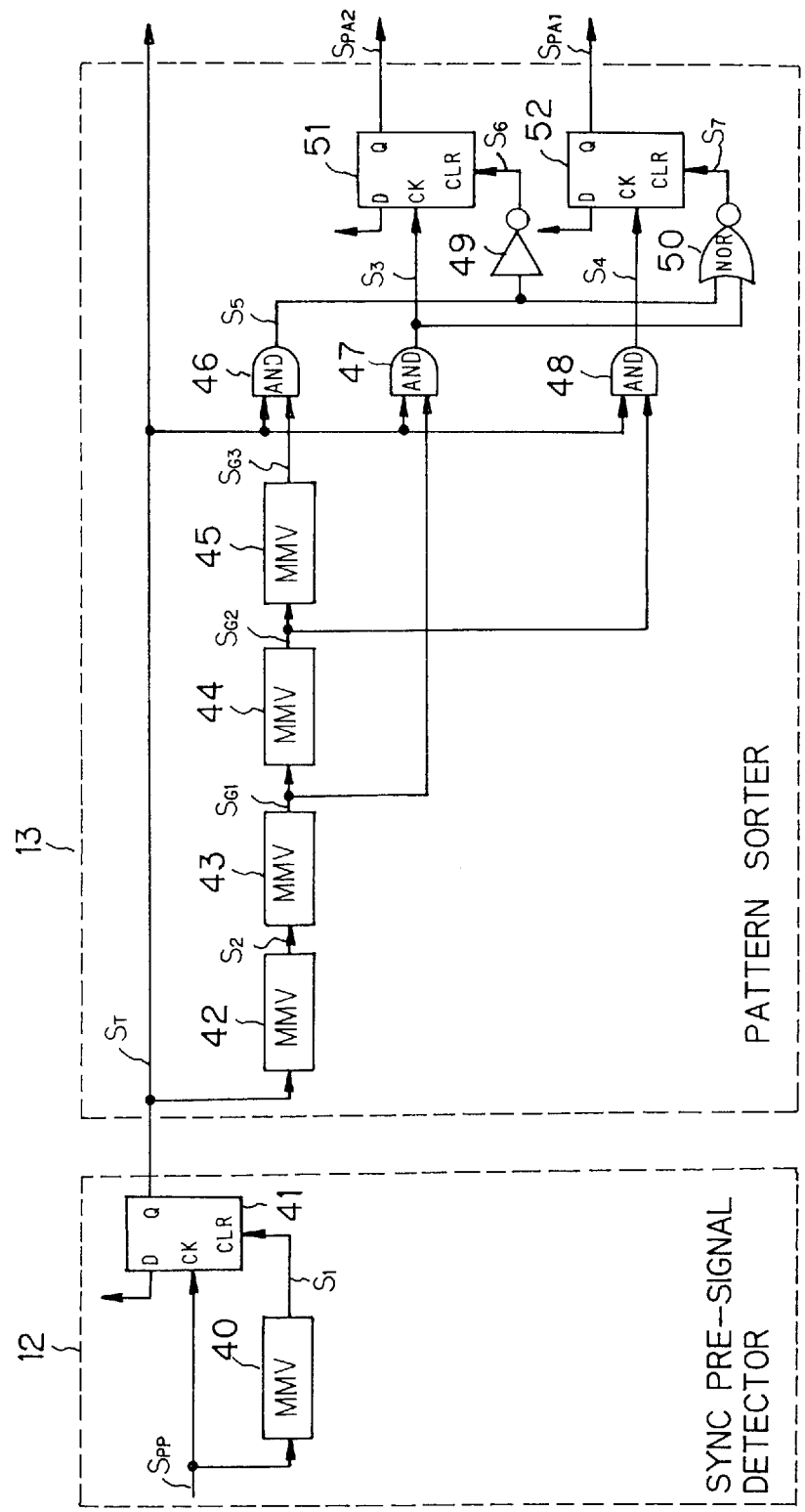
FIG. 7 is a block diagram of a sync pre-information detector and a pattern sorter of the embodiment.

As shown in FIG. 7, the sync pre signal detector 12 is provided with a mono-multi-vibrator (MMV) 40 and a flip-flop circuit 41. The pattern sorter 13 is provided with mono-multi-vibrators 42, 43, 44 and 45, flip-flop circuits 51 and 52 AND circuit 46, 47 and 48, an inverter circuit 49, and a NOR circuit 50. Among those elements, the gate signal generation means has the mono-multi vibrators 43, 44 and 45, while the judgment means has the AND circuits 46, 47 and 48, the inverter circuit 49, the NOR circuit 50, and the flip-flop circuits 51 and 52.

Figure 8:
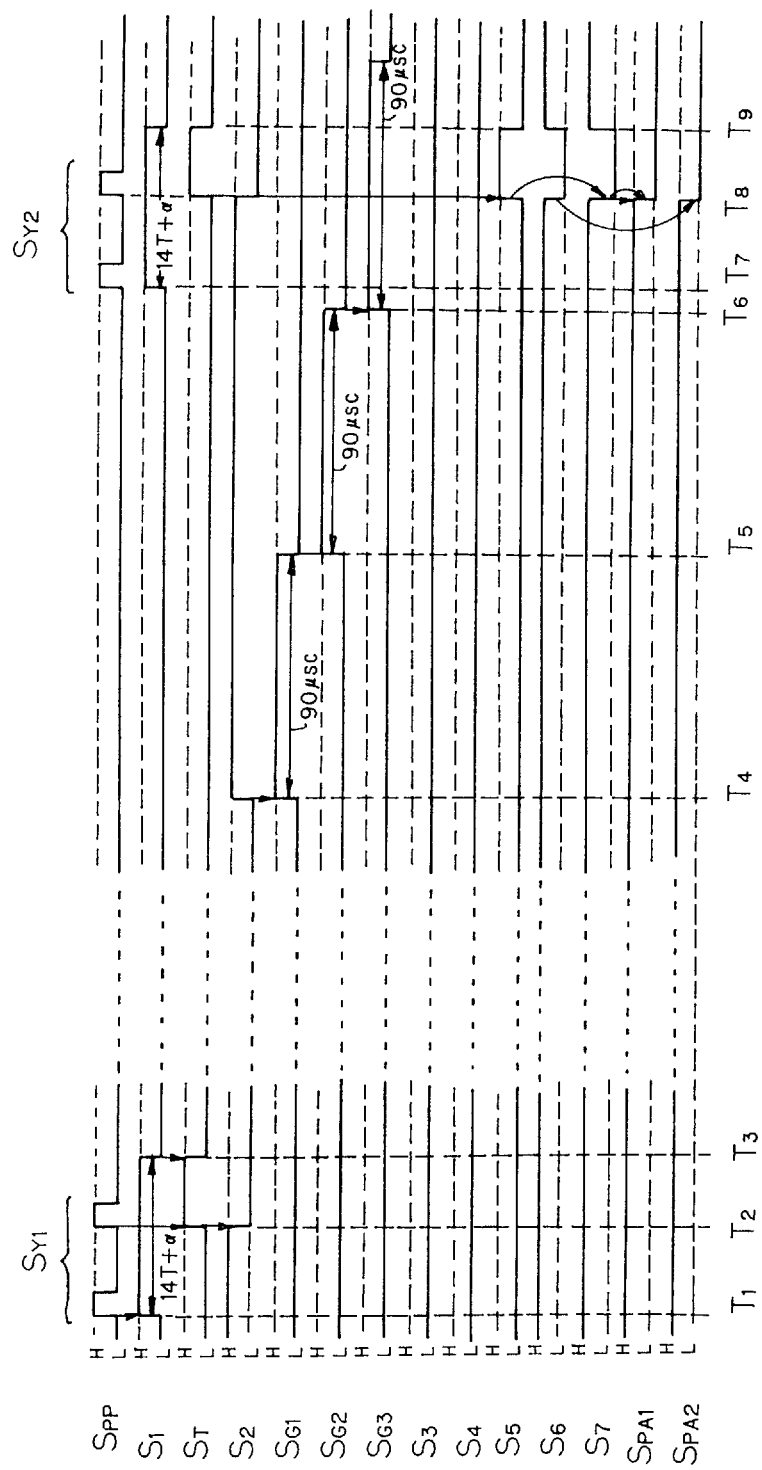
FIG. 8 is a timing chart showing an operation of each element in case of a detection pattern II.
Figure 9:
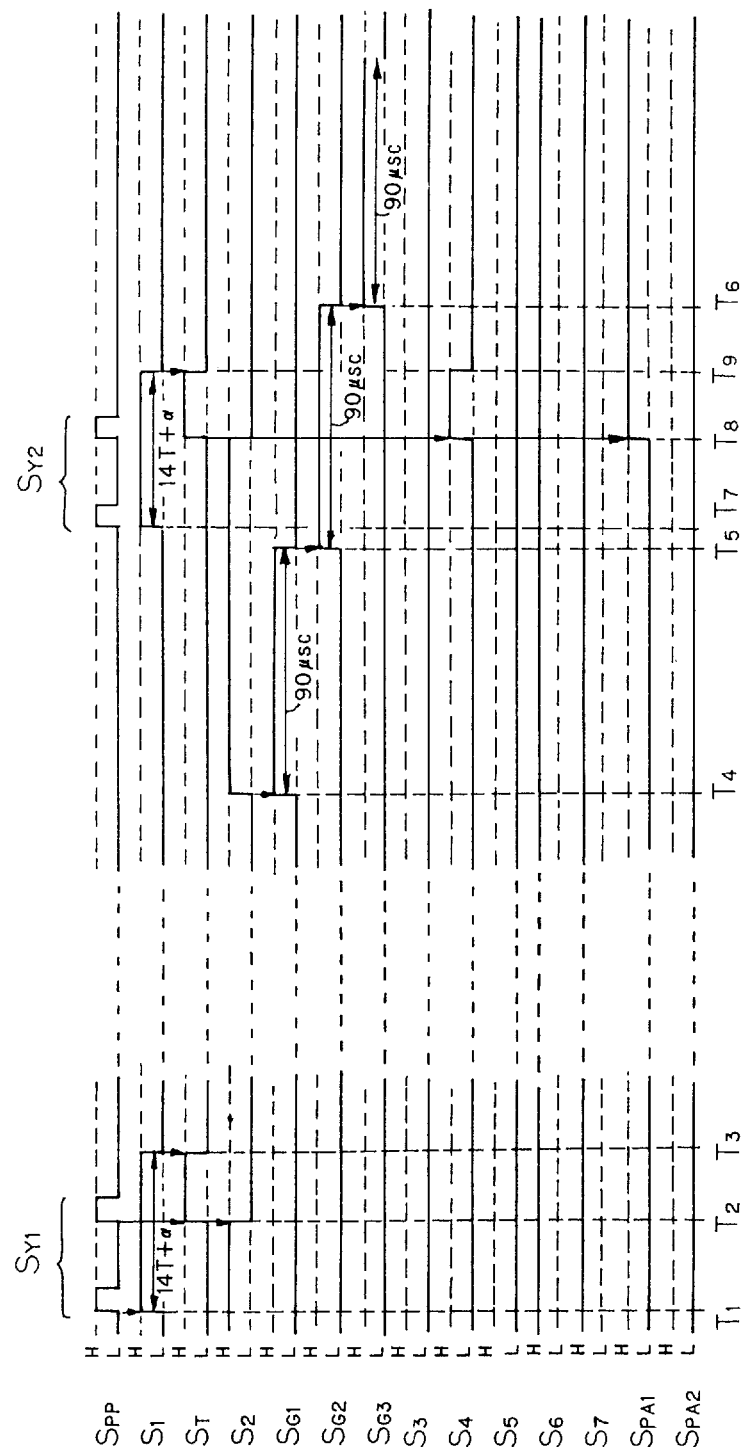
FIG. 9 is a timing chart showing an operation of each element in case of a detection pattern I or IV.
Figure 10:
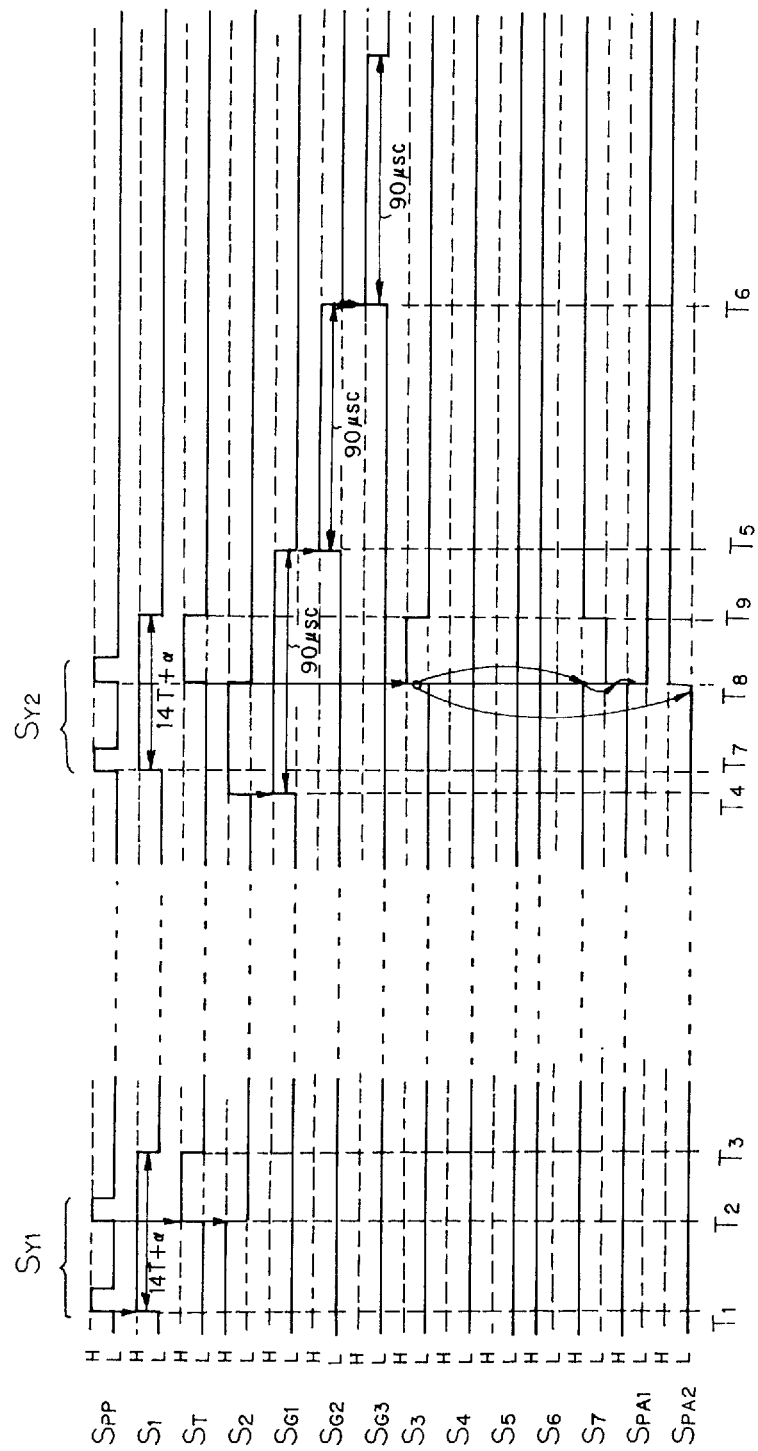
FIG. 10 is a timing chart showing an operation of each element in case of a detection pattern III.

Nextly, the operations of the sync pre-signal detector 12 and the pattern sorter 13 are explained with reference to FIGS. 8 to 10. FIGS. 8 to 10 correspond to the aforementioned detection patterns of respective sync pre-signals (refer to FIG. 3). More concretely, the timing chart of FIG. 8 corresponds to the detection pattern II, the timing chart of FIG. 9 corresponds to the detection pattern I or IV, and the timing chart o FIG. 10 corresponds to the detection pattern III in FIG. 3.

At first, the operation of the sync pre-signal detector 12 is explained.

There are two methods of detecting the sync pre-signal by the sync pre-signal detector 12. Namely, the first method is such a method of judging a pre-pit signal, which has a narrow pit interval, as the sync pre-signal, since the sync pre-signal consists of 2 bits (i.e. 2 pulses) and the data pre information consists of 1 bit so that the data pre-information is detected only once in on sync frame as shown in FIG. 2.

The second method is such a method of distinguishing and detecting the EVEN sync pre-signal and the ODD sync pre-signal, by the fact that the pulse interval of 2 bits constituting the EVEN sync pre-signal is different from that constituting the ODD sync pre-signal (e.g., 8T for the EVEN sync pre-signal while 10T for the ODD sync pre signal) as shown in FIG. 2.

The sync pre signal detector 12 performs the detection of the sync pre-signal by means of the above explained first method, in the present embodiment.

The operation is explained here more concretely with reference to FIG. 8. Namely, when the reproduction signal $S_{PP}$ is inputted into the sync pre-signal detector 12, the output signal $S_1$ of the mono-multi-vibrator 40 is changed in its level to a "H" level at the timing T1 of the respective pulses included in the reproduction signal (in case of FIG. 8, the first pulse in one sync pre-signal). Then, the output signal $S_1$ is maintained in the condition of the "H" level for the time duration obtained by adding a changing amount of about 10% due to the jitter etc., on to the time duration (14T) during which the sync pre signal is detected.

On the other hand, by the input of a second pulse (i.e. a second pulse in the sync pre-signal $S_{Y1}$ in the reproduction signal $S_{PP}$ in FIG. 8) while the output signal $S_1$ is at the "H" level, the flip-flop circuit 41 detects the reproduction signal $S_{PP}$, which has this second pulse, as the sync pre-signal $S_{Y1}$. Then, the flip-flop circuit 41 outputs the timing signal $S_T$ which is triggered by the second pulse to be changed to the "H" level, at a timing T2 at which the second pulse is inputted. Here, the timing signal $S_T$ is a signal functioning as a standard for the cycle of the sync pre-signal. Since the flip-flop circuit 41 is reset at a timing T3 at which the output signal $S_1$ is changed to the "L" level, the timing signal $S_T$ is also changed to the "L" level at the timing T3.

By the operations explained above, the sync pre-signal $S_{Y1}$ is detected and the timing signal $S_T$ corresponding to the timing of its signal detection is outputted by the sync pre-signal detector 12.

Nextly, the operation of the pattern sorter 13 is explained.

The pattern sorter 13 of the present embodiment generates three gate signals $S_{G1}$ to $S_{G3}$, which are changed to the "H" level for the time duration of one sync frame respectively and which timings to be changed to the "H" level respectively are shifted from each other by the time duration of one sync frame period. And that, the pattern sorter 13 generates the gate signals $S_{G1}$ to $S_{G3}$ with respect to the timing as a standard timing, at which the first sync pre-signal among arbitrary two sync pre-signals is detected, so that the pattern sorter 13 sorts the relationship between the two sync pre-signals to one of the aforementioned detection patterns I to IV, depending upon which one of the time durations, during which the three gate signals $S_{G1}$ to $S_{G3}$ are at the "H" levels respectively, includes the timing at which the second sync pre-signal is detected.

At first, the case where the change of the detection pattern of the sync pre-signal is the aforementioned detection pattern II is explained with reference to FIG. 8. In FIG. 8, it is assumed that the first sync pre-signal $S_{Y1}$ is the sync pre-signal recorded in the last EVEN frame, and the second sync pre signal $S_{Y2}$ is the sync pre-signal recorded in the first ODD frame.

In case that the change of the detection pattern of the sync pre-signal is the aforementioned detection pattern II, at first, the output signal $S_2$ of the mono-multi-vibrator 42 is change from the "H" level to the "L" level at the timing T2 at which the timing signal $S_T$ outputted from the sync pre-signal detector 12 is changed from the "L" level to the "H" level. At this time, the output signal $S_2$ of the mono-multi-vibrator 42 is in the "L" level by the time duration (i.e. the time interval between a timing T3 to a timing T4 in FIG. 8), which is obtained by subtracting the time duration of one sync frame (e.g. 1488T=about 90 $\mu$sec) from the time duration of one recording sector (i.e., the time duration corresponding to the interval of the signal detection of the sync pre signal which are recorded continuously in the EVEN frame or continuously in the ODD frame), and further subtracting from it about 45 $\mu$sec considering the error amount due to the jitter etc. of the timing at which the sync pre-signal is detected. Then, the output signal $S_2$ of the mono-multi-vibrator 42 is changed to the "H" level at the timing H4.

Nextly, at the timing T4 at which the output signal $S_2$ of the mono-multi-vibrator 42 is changed from the "L" level to the "H" level, the gate signal $S_{G1}$ of the mono-multi-vibrator 43, which has been at the "L" level, is changed to the "H" level, and is kept to be at the "H" level for the time duration of one sync frame (about 90 $\mu$sec Then, at the timing T5 at which the gate signal $S_{G1}$ is changed to the "L" level, the gate signal $S_{G2}$ of the mono-multi-vibrator 44, which has been at the "L" level, is changed to the "H" level, and is kept to be at the "H" level for the time duration of one sync frame.

Further, at the timing $T_6$ at which the gate signal $S_{G2}$ is changed to the "L" level, the gate signal $S_{G3}$ of the mono-multi-vibrator 45, which has been at the "L" level, is change to the "H" level, and is kept to be at the "H" level for the time duration of one sync frame.

Here, the general functions and meanings of the gate signals $S_{G1}$ to $S_{G3}$ are investigated here.

At first, the gate signal $S_{G1}$ is investigated. A described above, the gate signal $S_{G1}$ is changed to the "H" level a the timing T4 at which it has elapsed the time duration, which is obtained by subtracting the time duration of one sync frame and the time duration of the jitter error from the time duration of one recording sector, from the timing T2 at which the timing signal $S_T$ indicating the first sync pre-signal $S_{Y1}$ in FIG. 8 is changed to the "H" level. Then, the gate signal $S_{G1}$ is kept to be at the "H" level for the time duration of one sync frame. Therefore, if the time duration between the first sync pre-signal $S_{Y1}$ and the second sync pre-signal $S_{Y2}$ next to the first sync pre-signal $S_{Y1}$ is shorter than the time duration of one recording sector by the time duration of one sync frame (which corresponds to the detection pattern III described later in detail), this next sync pre-signal $S_{Y2}$ is detected during the time duration while the gate signal $S_{G1}$ is at the "H" level as whon in FIG. 10.

Nextly, the gate signal $S_{G2}$ is investigated. The gate signal $S_{G2}$ is resultantly changed to the "H" level at the timing T5 at which it has elapsed the time duration, which is obtained by subtracting the time duration of the jitter error from the time duration of one recording sector, from the timing T2, at which the timing signal $S_T$ indicating the timing of the first sync pre-signal $S_{Y1}$ in FIG. 8 is changed to the "H" level. Then, the gate signal $S_{G2}$ is kept to be at the "H" level for the time duration of one sync frame. Therefore, if the time duration between the first sync pre-signal $S_{Y1}$ and the second sync pre-signal $S_{Y2}$ next to the first sync pre-signal $S_{Y1}$ is equal to one recording sector (which corresponds to the detection pattern I or IV described later in detail), the next sync pre-signal $S_{Y2}$ is detected during the time duration while the gate signal $S_{G2}$ is at the "H" level as shown in FIG. 9.

Nextly, the gate signal $S_{G3}$ is investigated. The gate signal $S_{G3}$ is resultantly changed to the "H" level at the timing T6 at which it has elapsed the time duration, which is obtained by adding the time duration of one sync frame and the time duration of the jitter error to the time duration of one recording sector, from the timing T2, at which the timing signal $S_T$ indicating the timing of the first sync pre-signal $S_{Y1}$ in FIG. 8 is changed to the "H" level. Then, the gate signal $S_{G3}$ is kept to be at the "H" level for the time duration of one sync frame. Therefore, if the time duration between the first sync pre-signal $S_{Y1}$ and the second sync pre-signal $S_{Y2}$ next to the first sync pre-signal $S_{Y1}$ is longer than the time duration of one recording sector by the time duration of one sync frame (which corresponds to the detection pattern II in FIG. 8), the next sync pre-signal $S_{Y2}$ is detected during the time duration while the gate signal $S_{G3}$ is at the "H" level as shown in FIG. 8.

Summarizing the investigations as for the gate signals $S_{G1}$ to $S_{G3}$ as described above, in case that the detection pattern in which two sync pre-signals are detected is the detection pattern I or IV of FIG. 3 (FIG. 9), the timing at which the second (next) sync pre-signal is detected is within the time duration while the gate signal $S_{G2}$ is at the "H" level. In case that the detection pattern in which two sync pre-signals are detected is the detection pattern II of FIG. 3 (FIG. 8), the timing at which the second (next) sync pre-signal is detected is within the time duration while the gate signal $S_{G3}$ is at the "H" level. In case that the detection pattern in which two sync pre-signals are detected is the detection pattern III of FIG. 3 (FIG. 10), the timing at which the second (next) sync pre-signal is detected is within the time duration while the gate signal $S_{G1}$ is at the "H" level.

In FIG. 8 again, after the gate signals $S_{G1}$ to $S_{G3}$ are generated, when the second sync pre-signal $S_{Y2}$ as in the detection pattern II is detected, the output signal $S_1$ is again changed to the "H" level at a timing T7 at which the second sync pre-signal $S_{Y2}$ is detected. Further, the timing signal $S_T$ corresponding to the sync pre-signal $S_{Y2}$ is changed to the "H" level at a timing T8 at which the second pulse included in the sync pre-signal $S_{Y2}$ is detected.

Here, the time duration, while the timing signal $S_T$ corresponding to the sync pre-signal $S_{Y2}$ is at the "H" level, is included in the time duration, while the gate signal $S_{G3}$ is at the "H" level as described above and as shown in FIG. 8. Therefore, since both of the gate signal $S_{G3}$ and the timing signal $S_T$ are at the "H" levels respectively, the output signal $S_5$ of the AND circuit 46 is changed to the "H" level at a timing T8. Thus, the output signal S6 of the inverter circuit 49, which has been at the "H" level is changed to the "L" level in correspondence with the output signal $S_5$.

On the other hand, during the time duration while the gate signals $S_{G1}$ or $S_{G2}$ are at the "H" level, since the timing signal $S_T$ is kept to be the "L" level as it is, both of the output signal $S_3$ of the AND signal 47 and the output signal $S_4$ of the AND circuit 48 are at the "L" levels respectively. Therefore, the output signal $S_7$ of the NOR circuit 50 is changed to the "L" level at the timing T8.

According to the relationship between the respective output signals, the judgment signal $S_{PA1}$ which is the output signal of the flip-flop circuit 51 and which has been at the "H" level, is changed to the "L" level. In the same manner, the judgment signal $S_{PA2}$ which is the output signal of the flip-flop circuit 52 is changed to the "L" level.

Nextly, at the timing T9 at which the timing signal $S_T$ is changed to the "L" level, the conditions of the output signals $S_5$, $S_6$ and $S_7$ are correspondingly changed. At that time, the conditions of the judgment signals $S_{PA1}$ and $S_{PA2}$ are not changed.

As explained with reference to FIG. 8, at the timing at which the timing signal $S_T$ is detected (i.e. the timing at which the sync pre-signal $S_{Y2}$ is detected), if the judgment signal $S_{PA1}$ is changed from the "H" level to the "L" level and the judgment signal $S_{PA2}$ is changed form the "H" level to the "L" level, the sync pre-signal $S_{Y2}$ corresponding to the timing signal $S_T$ is judged to be changed in its cycle which is detected in correspondence with the detection pattern II.

Nextly, the case where the change of the detection pattern of the sync pre-signal is the aforementioned detection pattern IV is explained with reference to FIG. 9. In FIG. 9, it is assumed that the first sync pre-signal $S_{Y1}$ is the sync pre-signal recorded in the first ODD frame, and the second sync pre-signal $S_{Y2}$ is the sync pre-signal recorded in the next ODD frame. Namely, the sync pre-signal immediately prior to the sync pre signal $S_{Y1}$ is recorded in the EVEN frame.

In case that the change of the detection pattern of the sync pre-signal is the aforementioned detection pattern IV, the operations of the sync pre-signal detector 12 for inputting the reproduction signal $S_{PP}$ and generating the timing signal $S_T$ on the basis of the inputted signal, and the operations of the pattern sorter 13 for generating respective gate signals $S_{G1}$ to $S_{G3}$ on the basis of the timing signal $S_T$, are the same as the case of FIG. 8 explained above in detail. Thus, the detailed explanations thereof are omitted.

In FIG. 9, after the gate signals $S_{G1}$ and $S_{G2}$ are generated, when the second sync pre-signal $S_{Y2}$ in the detection pattern I is detected, the output signal $S_1$ is changed to the "H" level at the timing T7 at which the second sync pre signal $S_{Y2}$ is detected. Further, at the timing T8 at which the second pulse included in the sync pre-signal $S_{Y2}$ is detected, the timing signal $S_T$ corresponding to the sync pre-signal $S_{Y2}$ is changed to the "H" level.

Here, the time duration, while the timing signal $S_T$ corresponding to the sync pre-signal $S_{Y2}$ is at the "H" level, is included in the time duration while the gate signal $S_{G2}$ is at the "H" level as described above and as shown in FIG. 9, since the interval between the sync pre-signals $S_{Y1}$ and $S_{Y2}$ coincides with the time duration of one recording sector. Therefore, since both of the gate signal $S_{G2}$ and the timing signal $S_T$ are at the "H" levels respectively, the output signal $S_4$ of the AND circuit 48 is changed to the "H" level at a timing T8. Thus, the judgment signal $S_{PAJ}$ as the output signal of the flip-flop circuit 52, which has been at the "L" level (refer to FIG. 8), is changed to the "H" level in correspondence with the output signal $S_4$.

On the other hand, during the time duration while the gate signals $S_{G1}$ or $S_{G3}$ are at the "H" level, since the timing signal $S_T$ is kept to be the "L" level as it is, both of the output signal $S_3$ of the AND signal 47 and the output signal $S_5$ of the AND circuit 46 are at the "L" levels respectively. Therefore, the conditions of the output signal $S_6$ of the inverter circuit 49 and the output signal $S_7$ of the NOR circuit 49 are not changed. Thus, the condition of the judgment signal $S_{PA2}$ is not changed either.

Nextly, at the timing T9 at which the timing signal $S_T$ is changed to the "L" level, the condition of the output signal S4 is correspondingly changed. At this time, the conditions of the judgment signals $S_{PA1}$ and $S_{PA2}$ are not changed.

As explained with reference to FIG. 9, at the timing at which the timing signal $S_T$ is detected, if the judgment signal $S_{PA1}$ is changed from the "L" level to the "H" level and the judgment signal $S_{PA2}$ is kept to be the "L" level, the sync pre-signal $S_{Y2}$ corresponding to the timing signal $S_T$ is judged to be not-changed in its cycle which is detected in correspondence with the detection pattern IV. As for the sync pre-signals recorded in the ODD frame after the sync pre-signal $S_{Y2}$, since the above mentioned operations from the timing T4 to the timing T9 are repeated each time when the sync pre-signal is detected, the condition where the judgment signal $S_{PA1}$ is at the "H" level and the judgment signal $S_{PA2}$ is at the "L" level is continued.

On the other hand, as for the case where the detection pattern of the sync pre-signal is the detection pattern I, the condition of the judgment signal $S_{PA1}$ is kept to be at the "H" level according to the above described operations.

Nextly, the case where the change of the detection pattern of the sync pre-signal is the aforementioned detection pattern III is explained with reference to FIG. 10. In FIG. 10, it is assumed that the first sync pre-signal $S_{Y1}$ is the sync pre-signal recorded in the first ODD frame, and the second sync pre-signal $S_{Y2}$ is the sync pre-signal recorded in the first EVEN frame. Namely, the sync pre-signal immediately prior to the sync pre-signal $S_{Y1}$ is recorded continuously in the ODD frame.

In case that the change of the detection pattern of the sync pre-signal is the aforementioned detection pattern III, the operations of the sync pre-signal detector 12 for inputting the reproduction signal $S_{PP}$ and generating the timing signal $S_T$ on the basis of the inputted signal, and the operations of the pattern sorter 13 for generating respective gate signals $S_{G1}$ to $S_{G3}$ on the basis of the timing signal $S_T$, are the same as the case of FIG. 8 explained above in detail. Thus, the detailed explanations thereof are omitted.

In FIG. 10, after the gate signals $S_{G1}$ and $S_{G2}$ are generated, when the second sync pre-signal $S_{Y2}$ in the detection pattern III is detected, the output signal $S_1$ is changed to the "H" level at the timing T7 at which the second sync pre-signal $S_{Y2}$ is detected. Further, at the timing T8 at which the second pulse included in the sync pre-signal $S_{Y2}$ is detected, the timing signal $S_T$ corresponding to the sync pre-signal $S_{Y2}$ is changed to the "H" level.

Here, the time duration, while the timing signal $S_T$ corresponding to the sync pre-signal $S_{Y2}$ is at the "H" level, is included in the time duration while the gate signal $S_{G1}$ is at the "H" level as described above and as shown in FIG. 10. Therefore, since both of the gate signal $S_{G1}$ and the timing signal $S_T$ are at the "H" levels respectively, the output signal $S_3$ of the AND circuit 47 is changed to the "H" level at the timing T8.

On the other hand, during the time duration while the gate signals $S_{G2}$ and $S_{G3}$ are at the "H" level, since the timing signal $S_T$ is kept to be the "L" level as it is, both of the output signal $S_5$ of the AND signal 46 and the output signal $S_4$ of the AND circuit 46 are at the "L" levels respectively. Therefore, the output signal $S_7$ of the NOR circuit 50, which has been at the "H" level, is changed to the "L" level in correspondence with the output signal $S_3$.

According to the relationships between the above described respective output signals, at the timing T8, the judgment signal $S_{PA1}$, which has been at the "H" level, is changed to the "L" level. In the same manner, the judgment signal $S_{PA2}$, which is the output signal of the flip-flop circuit 52 and which has been at the "L" level, is changed to the "H" level.

Nextly, at the timing T9 at which the timing signal $S_T$ is changed to the "L" level, the conditions of the output signals $S_3$ and $S_7$ are correspondingly changed. At this time, the conditions of the judgment signals $S_{PA1}$ and $S_{PA2}$ are not changed.

As explained with reference to FIG. 10, at the timing at which the timing signal $S_T$ is detected, if the judgment signal $S_{PA1}$ is changed from the "H" level to the "L" level and the judgment signal $S_{PA2}$ is changed from the "L" level to the "H" level, the sync pre-signal corresponding to the timing signal $S_T$ is judged to be changed in its cycle which is detected in correspondence with the detection pattern III According to the above described operations of the sync pre-signal detector 12 and the pattern sorter 13 as shown in FIGS. 8 to 10, as for the change of the detection patterns of the sync pre-signal, the change of the detection pattern as the detection pattern II can be judged by the fact that the judgment signal $S_{PA1}$ is changed from the "H" level to the "L" level and that the judgment signal $S_{PA2}$ is also changed form the "H" level to the "L" level at the detection timing of the sync pre-signal (at the timing T8 of the timing signal $S_T$). On the other hand, the change of the detection pattern as the detection pattern III can be judged by the fact that the judgment signal $S_{PA1}$ is changed from the "H" level to the "L" level and that the judgment signal $S_{PA2}$ is also changed form the "L" level to the "H" level at the detection timing T8 of the sync pre-signal $S_Y$. Further, the continuity of the detection pattern without changing (corresponding to the detection pattern I or IV) can be judged by the fact that the judgment signal $S_{PA1}$ is kept to be at the "H" level at the detection timing T8 of the sync pre-signal $S_{Y2}$. In case that the detection pattern as the detection pattern I is continuous and not changed, the condition of the judgment signal $S_{PA2}$ is kept to be at the "H" level. In case that the detection pattern as the detection pattern W is continuous and not changed, the condition of the judgment signal $S_{PA2}$ is kept to be at the "L" level. Therefore, depending on the conditions of the judgment signals $S_{PA1}$ and $S_{PA2}$, it is possible to detect the change in the detection cycle of the sync pre-signal by the CPU 14.

Nextly, the operations of the CPU 14 are explained with reference to FIGS. 11 and 12.

Figure 11:
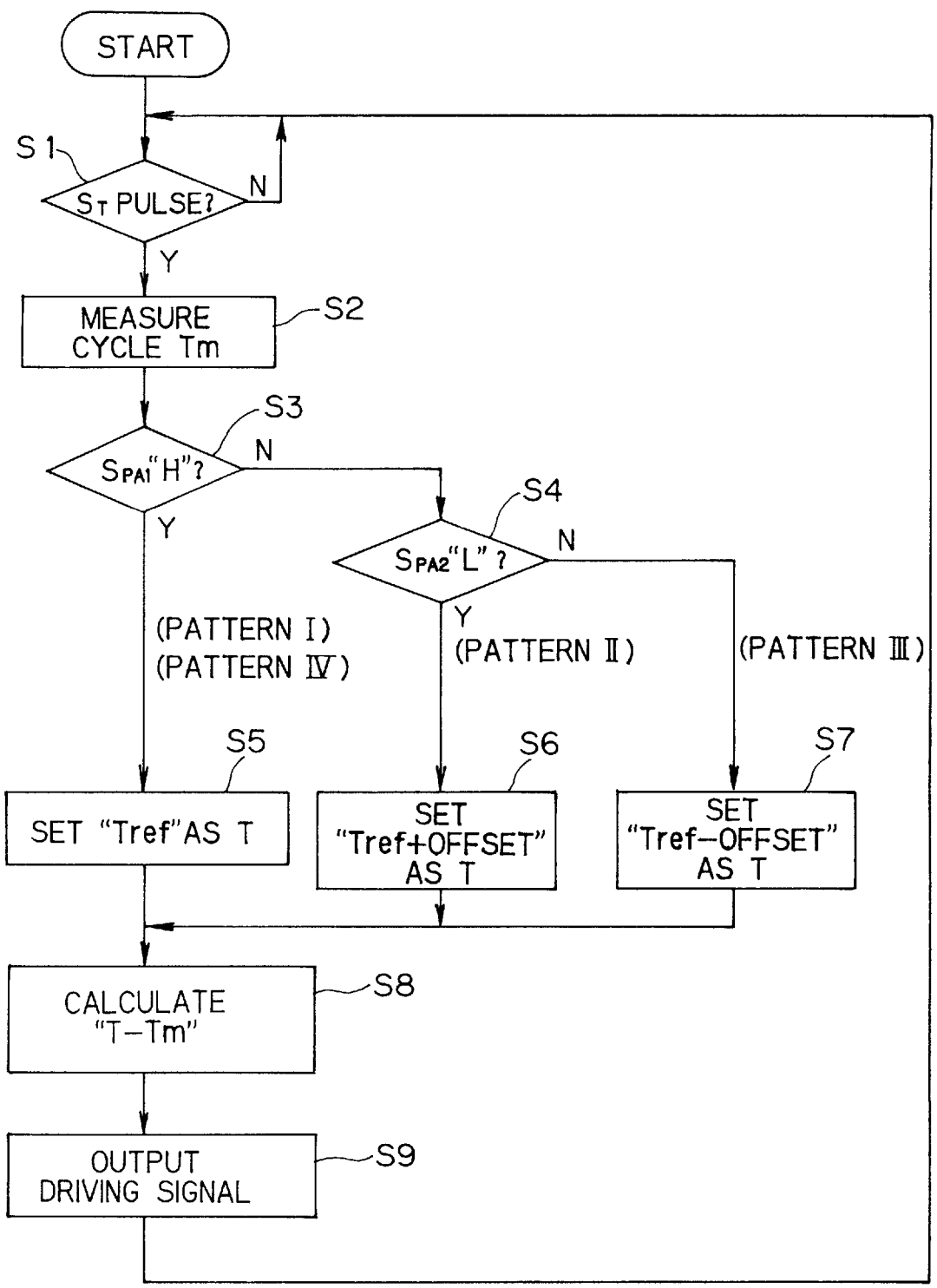
FIG. 11 is a flow chart showing an operation of a CPU of the first embodiment.
Figure 12:
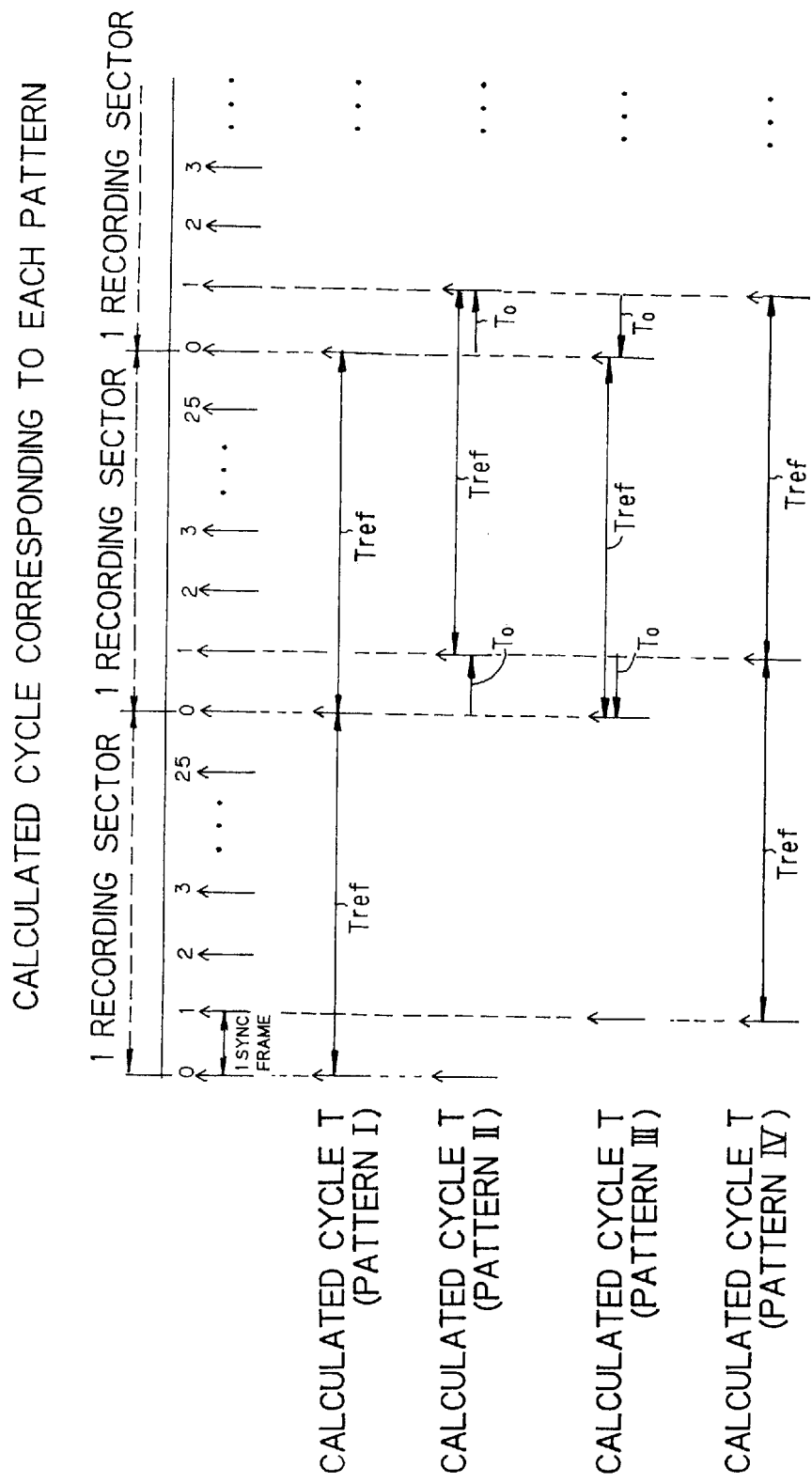
FIG. 12 is a diagram showing an execution cycle corresponding to each detection pattern.

In a flow chart of FIG. 11, at first by the CPU 14, it is judged whether or not the timing signal $S_T$ is detected (step Sl). Then, if the timing signal $S_T$ is not detected (step S1: NO), it stands by and waits for the detection, as it is. If the timing signal $S_T$ is detected (step S1: YES), the time interval between one timing signal $S_T$ and another timing signal $S_T$ immediately previous to said one timing signal $S_T$ is measured by use of the cycle measurement device 17, so that the cycle Tm of the timing signal $S_T$ is measured (step S2).

Nextly, it is judged whether or not the judgment signal $S_{PA1}$, at the timing at which the timing signal $S_T$ is detected, is at the "H" level (step S3).

At the step S3, if the judgment signal $S_{PA1}$ is at the "H" level (step S3: YES), it is judged that the detection pattern of the detected sync pre-signal is the detection pattern I or IV, and the calculated cycle T is kept to be the standard cycle $T_{ref}$ of the standard signal $S_R$ as it is (step S5).

On the other hand, at the step S3, if the judgment signal $S_{PA1}$ is not at the "H" level (step S3: NO), it is judged that the detection pattern of the detected sync pre-signal is the detection pattern II or III, and it is further judged whether or not the judgment signal $S_{PA2}$ is at the "L" level (step S4).

At the step S4, if the judgment signal $S_{PA2}$ is at the "L" level (step S4: YES), it is judged that the detection pattern of the detected sync pre-signal $S_Y$ is changed as the detection pattern II, so that the cycle To of the offset signal So (i.e. the cycle corresponding to one sync frame) is added to the standard cycle $T_{ref}$ as shown in FIG. 12, to be the calculated cycle T (step S6).

On the other hand, at the step S4, if the judgment signal $S_{PA2}$ is at the "H" level (step S4: NO), it is judged that the detection pattern of the detected sync pre-signal $S_Y$ is changed as the detection pattern III, so that the cycle To of the offset signal So is subtracted from the standard cycle $T_{ref}$ as shown in FIG. 12, to be the calculated cycle T (step S7).

Then, at a step S8, a difference between the calculated cycle T, which has been calculated at the step S5, S6 or S7, and the measured cycle Tm, which has been measured at the step S2, is calculated. Then, the driving signal $S_D$ is generated by the motor control circuit 23 to rotate the spindle motor 16 so as to reduce the calculated difference "T−Tm" to zero (step S9), and is amplified and outputted by the amplifier 22. After that, the high frequency component noise in the driving signal $S_D$ is removed by the LPF 15, and the spindle motor 16 is rotated on the basis of this driving signal $S_D$ through the LPF 15.

The above described operations are repeated each time when the timing signal $S_T$ is detected. Therefore, even in the case of the detection pattern II or III, once the offset is added or subtracted, the calculated cycle T is made equal to the standard cycle $T_{ref}$ from the sync pre-signal at the time of adding or subtracting the offset (refer to FIG. 12).

As described above in detail, according to the rotation control apparatus $SS_1$ of the first embodiment, the cycle of the detected sync pre-signals is detected, the detection pattern in the change of the detection cycle of the sync pre-signals is judged on the basis of the detection result, and the rotation control is performed by offsetting the calculated cycle T from the standard cycle $T_{ref}$ to generate the driving signal $S_D$ on the basis of the judgment result. Accordingly, even if the cycle of the detected sync pre-signal is changed transiently by the time duration of one sync frame, it is possible to keep the rotation condition (CLV) of the DVD-R 1 without changing it, and it is possible to precisely record the record information by the precise rotation condition.

(III) Second Embodiment

Next, a rotation control apparatus as a second embodiment of the present invention will be explained with reference to FIGS. 13 to 15.

Although the detection pattern of the cycle of the sync pre-signals is detected by use of the sync pre-signal detector 12 and the pattern sorter 13 in the first embodiment, the operation same as the first embodiment is performed by a process of a CPU provided with a so-called "free run counter" without employing the sync pre-signal detector 12 and the pattern sorter 13, in the second embodiment. Here, the free run counter is a counter which is not bound to other signals etc. but can count independently.

At first, a configuration of the rotation control apparatus of the second embodiment is explained with reference to FIG. 13. In FIG. 13, the same constitutional elements as those in the rotation control apparatus $SS_1$ of FIG. 4 carry the same reference numerals and the explanations thereof are omitted.

Figure 13:
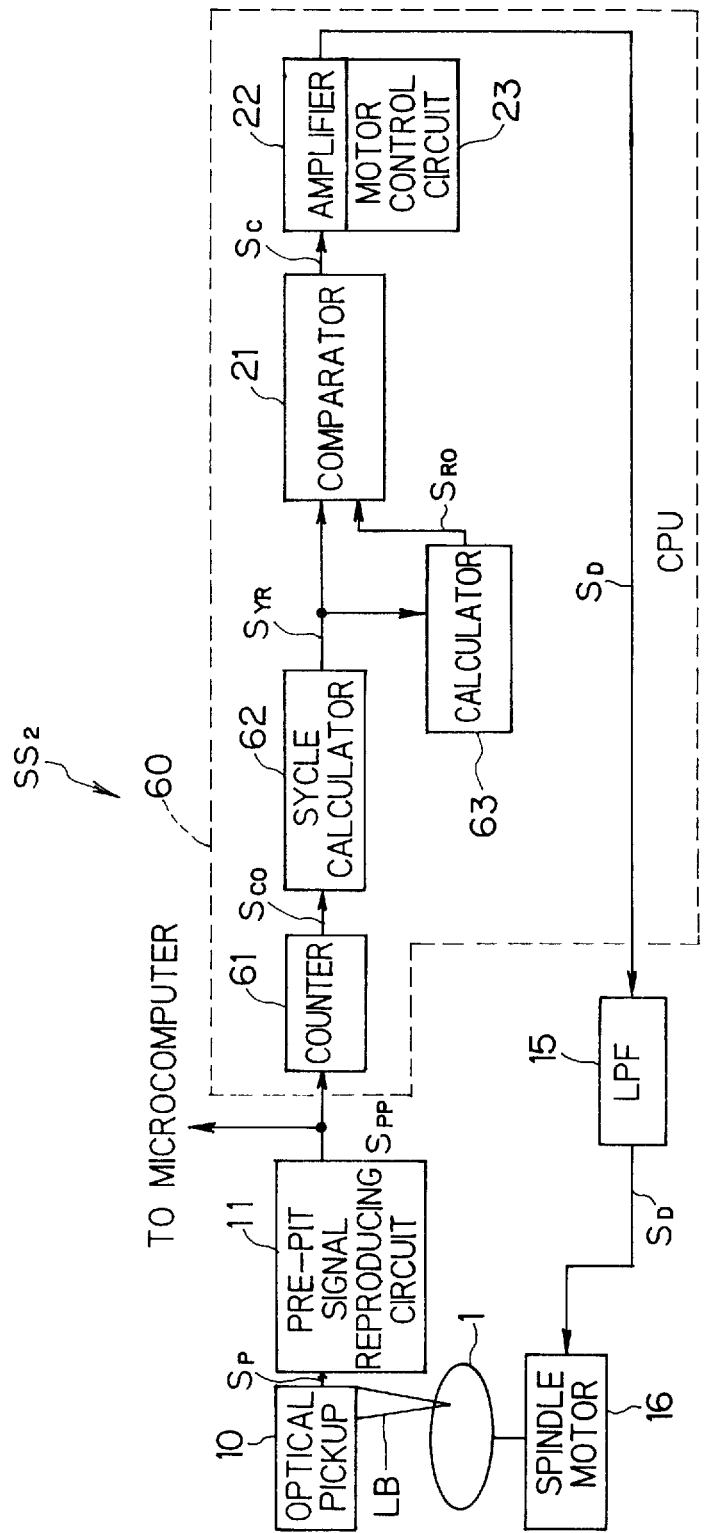
FIG. 13 is a block diagram of a rotation control apparatus of a second embodiment of the present invention.

As shown in FIG. 13, a rotation control apparatus $SS_2$ as the second embodiment is provided with: the optical pickup 10; the pre-pit signal reproducing circuit 11; a CPU 60 for counting on the basis of the pre-pit signal included in the reproduction signal $S_{PP}$, and calculating the cycle Tm of the sync pre-signal, judging to which one of the detection patterns the calculated cycle Tm corresponds, and outputting the driving signal $S_D$; the LPF 15: and the spindle motor 16.

The CPU 60 is provided with: a counter 61 as a free run counter for counting while being reset each time when the pre-pit signal in the reproduction signal $S_{PP}$ is detected, and outputting a count signal Sco; a cycle calculator 62 for calculating the cycle Tm of the sync pre-signal on the basis of the count signal Sco and outputting a cycle signal $S_{YR}$; a calculator 63 for judging to which one of the detection patterns the change of the detected cycle of the sync pre-signal belongs, on the basis of the calculated cycle Tm, adding or subtracting an offset cycle To (i.e. the cycle corresponding to one sync frame) with respect to a standard cycle $T_{ref}$ on the basis of the judgment result, and outputting a calculated signal $S_{RO}$ having a calculated cycle T; the comparator 21; the motor control circuit 23; and the amplifier 22.

Nextly, the operation of the rotation control apparatus $SS_2$ mainly as for the operation of the CPU 60 is explained with reference to FIGS. 14 and 15.

When the reproduction signal $S_{PP}$ is reproduced from the DVD-R 1 by the pickup 10 and the pre-pit signal reproducing circuit 11, the reproduction signal $S_{PP}$ including the pre-pit signal corresponding to the pre-pit 4 is inputted to the microcomputer not illustrated and the counter 61 of the CPU 60 respectively.

Figure 14:
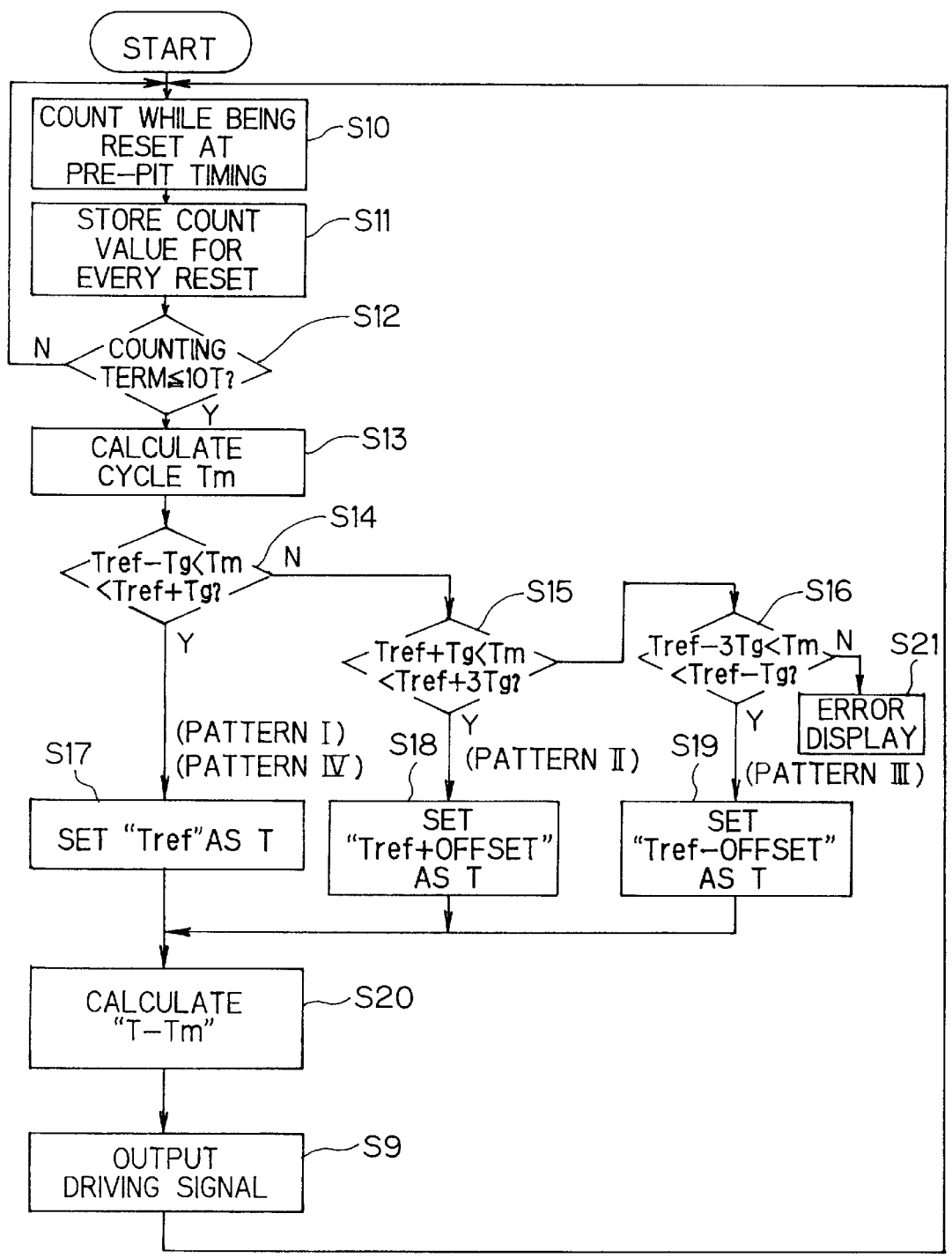
FIG. 14 is a flow chart showing an operation of a CPU as the second embodiment.
Figure 15:
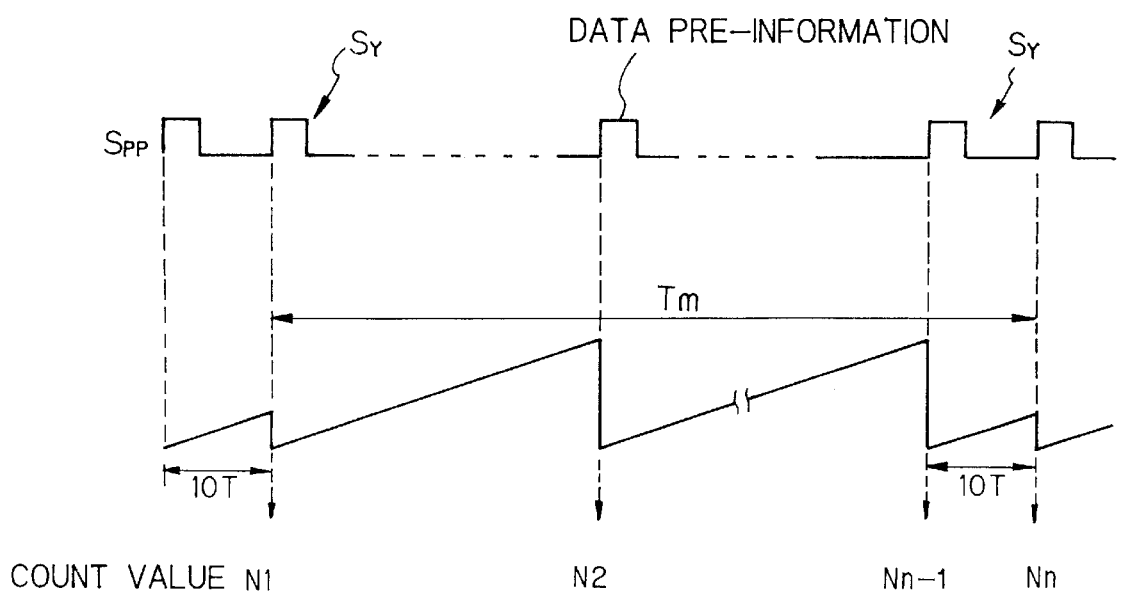
FIG. 15 is a timing chart showing an operation of a counter of the second embodiment.

Then, as shown in a flow chart of FIG. 14, at first, the counting operation is performed while being reset each time when the pre-pit signal is detected, to output the count signal Sco (step S10). Then, on the basis of the count signal Sco, the count value for every reset is stored one after another by the cycle calculator 62 (step S11). This operation is illustrated as in FIG. 15. In FIG. 15, each time when the pre-pit signal (which is either one of the pre-pit signal corresponding to the sync pre-signal $S_Y$ and the pre-pit signal corresponding to the data pre-information) in the reproduction signal $S_{PP}$, is detected, the count value of the counter 61 is reset one after another. Then, each count value from one reset to another reset next to said one reset (i.e., the count values N1, N2, ..., Nn−1, Nn in FIG. 15) is stored by the cycle calculator 62.

Nextly, it is judged whether or not the pre-pit signal, which counting term (i.e., a term from one reset to another reset next to said one reset) is shorter than 10T, is detected (step S12). The purpose of detecting the pre-pit signal which counting term is shorter than 10T at the step S12 is to detect or extract a pre-pit signal corresponding to the sync pre signal $S_Y$ from the reproduction signal $S_{PP}$, which also includes pre-pit signal corresponding to the data pre-information. Namely, as shown in FIG. 2, as for the sync pre-signal $S_Y$ the interval between the first pulse and the second pulse is 8T in case of the EVEN sync pre-signal, while the interval between the first pulse and the second pulse is 10T. On the other hand, as for the pre-it signal corresponding to the data pre-information, since the data pre-information is recorded only by an amount of 2T with respect to one sync frame, there is no possibility that another pre-pit signal is detected during the time duration of 10T before and after the data pre-information. Therefore, if the pre-pit signal is detected which counting term is not more than 10T, it is concluded that this detected pre-pit signal is either the EVEN sync pre-signal $S_Y$ or the ODD sync pre-signal $S_Y$.

At the step S12, if the counting term is greater than 10 T (step S12: NO), it is judged that the presently detected pre-pit signal is not corresponding to the sync pre signal $S_Y$, and the flow returns to the step S10 so as to perform the counting process repeatedly.

On the other hand, if the counting term is not greater than 10T (step S12: YES), it is judged that the detected pre-pit signal is corresponding to the sync pre-signal $S_Y$, and the cycle Tm between the two consecutive sync pre-signals $S_Y$ is calculated (step S13). More concretely as for this calculating operation, when the pre-pit signal corresponding to the sync pre-signal $S_Y$ is detected (step S12: YES), the cycle calculator 62 sums all of the count values, which have been stored during the time duration from the pre-pit signal corresponding to the sync pre signal $S_Y$ immediately previous to the present pre pit signal to the present pre-pit signal. Namely, the count values N2 to Nn shown in FIG. 15 are all summed up, and the resultant sum is set as the calculated cycle Tm between these two sync pre-signals $S_y$. Then, the cycle signal $S_{YR}$ corresponding to this calculated cycle Tm is outputted to the comparator 21 and the calculator 63.

Nextly, on the basis of the inputted cycle signal $S_{YR}$, at first, it is judged by the calculator 63 whether or not the cycle Tm falls between one cycle, which is obtained by subtracting a gate cycle Tg from the standard cycle $T_{ref}$ corresponding to one recording sector, and another cycle, which is obtained by adding the gate cycle Tg to the standard cycle $T_{ref}$ (step S14). Here, the gate cycle Tg is a cycle corresponding to a time length half of one sync frame. Thus, the judgment at the step S14 corresponds to the judgment whether or not the sync pre-signal $S_Y$ falls in the time duration corresponding to the gate signal $S_{G2}$ in the first embodiment (refer to FIG. 9).

At the step S14, if the cycle Tm is judged to fall in the time duration between said one cycle and said another cycle (step S14: YES), it is judged that the detection pattern of the detected sync pre-signal $S_Y$ is the detection pattern I or IV, and the standard cycle $T_{ref}$, as it is, is set as the calculated cycle T (step S17).

At the step S14, if the cycle Tm is not judged to fall in the time duration between said one cycle and said another cycle (step S14: NO), it is further judged by the calculator 63 whether or not the cycle Tm falls between one cycle, which is obtained by adding the gate cycle Tg to the standard cycle $T_{ref}$, and another cycle, which is obtained by adding a cycle, which is equal to three times of the gate cycle Tg, to the standard cycle $T_{ref}$ (step S15). Here, the judgment at the step S15 corresponds to the judgment whether or not the sync pre-signal $S_Y$ is in the time duration corresponding to the gate signal $S_{G3}$ in the first embodiment (refer to FIG. 8).

At the step S15, if the cycle Tm is judged to fall in the time duration between said one cycle and said another cycle (step S15: YES), it is judged that the detection pattern of the detected sync pre signal $S_Y$ is the detection pattern II, and the offset cycle To is added to the calculated cycle T to be set as the calculated cycle T as shown in FIG. 12 (step S18).

At the step S15, if the cycle Tm is not judged to fall in the time duration between said one cycle and said another cycle (step S15: NO), it is further judged by the calculator 63 whether or not the cycle Tm falls between one cycle, which is obtained by subtracting the gate cycle Tg from the standard cycle $T_{ref}$, and another cycle, which is obtained by subtracting a cycle, which is equal to three times of the gate cycle Tg, from the standard cycle $T_{ref}$ (step S16). Here, the judgment at the step S16 corresponds to the judgment whether or not the sync pre-signal $S_Y$ is in the time duration corresponding to the gate signal $S_{G1}$ in the first embodiment (refer to FIG. 10).

At the step S16, if the cycle Tm is judged to fall in the time duration between said one cycle and said another cycle (step S16: YES), it is judged that the detection pattern of the detected sync pre-signal $S_Y$ is the detection pattern III, and the offset cycle To is subtracted from the calculated cycle T to be set as the calculated cycle T as shown in FIG. 12 (step S19).

At the step S16, if the cycle Tm is not judged to fall in the time duration between said one cycle and said another cycle (step S16: NO), it is judged that an error unable to be corrected is generated due to the jitter at the time of detecting the pre-information etc., so that a predetermined error display is executed (step S21).

Then, at a step S20, the difference between the calculated cycle T calculated at the step S17, S18 or S19 by the comparator 21 and the cycle Tm calculated at the step S13 is calculated, the comparison signal Sc corresponding to the calculated difference is outputted, and the driving signal $S_D$ is generated by the motor control circuit 23 to rotate the spindle motor 16 so as to reduce the difference to zero (step S9), while the driving signal $S_D$ is amplified by the amplifier 22. After that, the high frequency component noise in the driving signal $S_D$ is removed by the LPF 15, and the spindle motor 16 is rotated.

The above described operations are repeated each time when the sync pre-signal $S_Y$ is detected. Thus, even in the case of the detection pattern II or III, once the offset is added or subtracted, the calculated cycle T is equal to the standard cycle $T_{ref}$ from the sync pre-signal $S_Y$ at the time of adding or subtracting the offset to it (refer to FIG. 12).

As described above in detail, according to the rotation control apparatus $SS_2$ of the second embodiment, the cycle of the sync pre-signal $S_Y$ is calculated from the detected pre-pit signal by means of the counter 61 and the cycle calculator 62, the detection pattern of the cycle change is judged on the basis of the calculated result by the calculator 63, and the calculated cycle T for generating the driving signal $S_D$ is offset from the standard cycle $T_{ref}$ on the basis of the judgment result to perform the rotation control. Therefore, in the same manner as the rotation control apparatus $SS_1$ of the first embodiment, even if the cycle of the signal detection of the sync pre-signal $S_Y$ is transiently changed by an amount of one sync frame, the rotation condition (CLV) of the DVD-R 1 can be maintained without changing, so that it is possible to precisely record the record information by the precise rotation condition.

According to the rotation control apparatus $SS_2$ of the second embodiment, since the sync pre-signal detector and the pattern sorter are not necessary, the above mentioned advantageous effect can be achieved by use of a rather simple construction as compared with the rotation control apparatus $SS_1$ of the first embodiment.

In each of the above explained embodiments, although the offset cycle To is added or subtracted with respect to the standard cycle $T_{ref}$ on the basis of the judged detection pattern of the sync pre-signal $S_Y$ the manner of adding or subtracting is not limited to this. For example, the offset cycle To may be added or subtracted with respect to the cycle Tm of the sync pre-signal $S_Y$ which has been detected (as in the first embodiment) or calculated (as in the second embodiment), such that the standard cycle $T_{ref}$ is not operated. In this case, if the detection pattern is the detection pattern I or IV, the addition or subtraction of the off set cycle To with respect to the cycle of the sync pre signal $S_Y$ is not performed. If the detection pattern is the detection pattern II, the offset cycle To is subtracted from the cycle Tm of the sync pre-signal $S_Y$. If the detection pattern is the detection pattern III, the offset cycle To is added to the cycle Tm of the sync pre-signal $S_Y$. In this case, the rotation control can be performed without changing the cycle of the standard signal, so that the generation of an error due to the change of the standard cycle $T_{ref}$ can be prevented.

In each of the explained embodiments, although the DVD-R 1 is based on the CLV method, the present invention can be adapted to the DVD-R 1 based on the CAV method. In this case, the interval of the sync pre-signal is controlled so as to make the rotation angular velocity of the DVD R constant, while it is controlled so as to make the signal detection cycle of the sync pre-signal constant in the above described first or second embodiment.

Further, in each of the above explained embodiments, the explanation was made as for the case of speed-controlling the DVD-R 1, the present invention can be adapted to the case of phasecontrolling the DVD-R 1.

The invention may be embodied in other specific forms without departing from the spirit or essential characteristics thereof. The present invention embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of controlling a rotation of a motor to rotate an information record medium, on which a plurality of synchronization signals are recorded by a predetermined record interval such that a record interval of two consecutive synchronization signals is transiently changed from the predetermined record interval, said method comprising the steps of:

detecting the synchronization signals one after another from said information record medium;

generating a standard signal having a predetermined cycle which is set in advance in correspondence with the predetermined record interval;

detecting a changing amount of an interval, at which the synchronization signals are detected by said synchronization signals detecting step, from the predetermined record interval; and controlling the rotation of the motor to be in a predetermined rotation condition corresponding to the predetermined cycle by canceling the changing amount detected by said changing amount detecting step, on the basis of the standard signal generated by said standard signal generating step and the changing amount detected by said changing amount detecting step.

2. A method according to claim 1, wherein said changing amount detecting step comprises the step of comparing the predetermined cycle of the standard signal generated by said standard signal generating step with a cycle of the synchronization signals detected by said synchronization signals detecting step.

3. A method according to claim 1, wherein said changing amount detecting step comprises the steps of:

generating a plurality of gate signals one after another which have time lengths corresponding to the changing amount respectively and which have time differences by amounts corresponding to the changing amount from each other, on the basis of the detected synchronization signals; and judging one of the gate signals corresponding to each of the detected synchronization signals so as to detect the changing amount.

4. A method according to claim 1, wherein said controlling step comprises the step of controlling the rotation of the motor by changing the cycle of the standard signal in said standard signal generating step on the basis of the detected changing amount.

5. A method according to claim 1, wherein said controlling step comprises the step of controlling the rotation of the motor by changing a cycle of the synchronization signals detected by said synchronization signals detecting step on the basis of the detected changing amount.

6. A method according to claim 1, wherein:

said information record medium comprises a disk type information record medium; and said controlling step comprises the step of controlling the rotation of the motor to be in a CLV (Constant Linear Velocity) condition as the predetermined rotation condition.

7. A method according to claim 1, wherein:

said information record medium comprises a disk type information record medium; and said controlling step comprises the step of controlling the rotation of the motor to be in a CAV (Constant Angular Velocity) condition as the predetermined rotation condition.

8. An apparatus for controlling a rotation of a motor to rotate an information record medium, on which a plurality of synchronization signals are recorded by a predetermined record interval such that a record interval of two consecutive synchronization signals is transiently changed from the predetermined record interval, said apparatus comprising:

a synchronization signals detection means for detecting the synchronization signals one after another from said information record medium;

a standard signal generation means for generating a standard signal having a predetermined cycle which is set in advance in correspondence with the predetermined record interval;

a changing amount detection means for detecting a changing amount of an interval, at which the synchronization signals are detected by said synchronization signals detection means, from the predetermined record interval; and a controller for controlling the rotation of the motor to be in a predetermined rotation condition corresponding to the predetermined cycle by canceling the changing amount detected by said changing amount detection means, on the basis of the standard signal generated by said standard signal generation means and the changing amount detected by said changing amount detection means.

9. An apparatus according to claim 8, wherein said changing amount detection means comprises a comparison means for comparing the predetermined cycle of the standard signal generated by said standard signal generation means with a cycle of the synchronization signals detected by said synchronization signals detection means.

10. An apparatus according to claim 8, wherein said changing amount detection means comprises:

a gate signal generation means for generating a plurality of gate signals one after another which have time lengths corresponding to the changing amount respectively and which have time differences by amounts corresponding to the changing amount from each other, on the basis of the detected synchronization signals; and a judgment means for judging one of the gate signals corresponding to each of the detected synchronization signals so as to detect the changing amount.

11. An apparatus according to claim 8, wherein said controller controls the rotation of the motor by changing the cycle of the standard signal in said standard signal generation means on the basis of the detected changing amount.

12. An apparatus according to claim 8, wherein said controller controls the rotation of the motor by changing a cycle of the synchronization signals detected by said synchronization signals detection means on the basis of the detected changing amount.

13. An apparatus according to claim 8, wherein:

said information record medium comprises a disk type information record medium; and said controller controls the rotation of the motor to be in a CLV (Constant Linear Velocity) condition as the predetermined rotation condition.

14. An apparatus according to claim 8, wherein:

said information record medium comprises a disk type information record medium; and said controller controls the rotation of the motor to be in a CAV (Constant Angular Velocity) condition as the predetermined rotation condition.

* * * * *